(12) United States Patent
Chen et al.

(10) Patent No.: US 8,547,311 B2
(45) Date of Patent: Oct. 1, 2013

(54) DUAL-IMAGE FLAT DISPLAY DEVICE

(75) Inventors: Chao-Yuan Chen, Hsin-Chu (TW);
Chieh-Wei Chen, Hsin-Chu (TW);
Hung-Lung Hou, Hsin-Chu (TW);
Chia-Yu Lee, Hsin-Chu (TW); Jenn-Jia Su, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 1084 days.

(21) Appl. No.: 12/541,159

(22) Filed: Aug. 13, 2009

(65) Prior Publication Data

US 2010/0039418 A1  Feb. 18, 2010

(30) Foreign Application Priority Data

Aug. 14, 2008  (TW) ................................ 97130936 A

(51) Int. Cl.
*G09G 3/36* (2006.01)
(52) U.S. Cl.
USPC ................................ 345/87; 349/56; 349/129
(58) Field of Classification Search
USPC ...................... 345/87–100; 349/56
See application file for complete search history.

(56) References Cited

U.S. PATENT DOCUMENTS

| 5,936,596 | A | 8/1999 | Yoshida et al. | |
|---|---|---|---|---|
| 6,936,845 | B2 * | 8/2005 | Kim et al. | 257/59 |
| 7,403,184 | B1 | 7/2008 | Moon | |
| 7,483,105 | B2 * | 1/2009 | Jun et al. | 349/139 |
| 2004/0032384 | A1 * | 2/2004 | Ohta et al. | 345/87 |
| 2005/0088453 | A1 * | 4/2005 | Ten | 345/589 |
| 2005/0259209 | A1 * | 11/2005 | Takeda et al. | 349/155 |
| 2006/0191177 | A1 | 8/2006 | Engel | |
| 2007/0126965 | A1 * | 6/2007 | Huang | |
| 2007/0182894 | A1 * | 8/2007 | Nakagawa et al. | 349/117 |
| 2008/0123009 | A1 * | 5/2008 | Son et al. | 349/46 |
| 2008/0170183 | A1 * | 7/2008 | Sugiyama | 349/96 |
| 2008/0204613 | A1 * | 8/2008 | Kim et al. | 349/33 |

FOREIGN PATENT DOCUMENTS

| CN | 1667693 | 9/2005 |
|---|---|---|
| CN | 1726418 | 1/2006 |
| JP | 2004302315 | 10/2004 |
| TW | I235268 | 7/2005 |
| TW | 200722812 | * 6/2007 |

* cited by examiner

*Primary Examiner* — Viet Pham
(74) *Attorney, Agent, or Firm* — Winston Hsu; Scott Margo

(57) ABSTRACT

A dual-image flat display device includes a first and a second substrates parallel with each other, a liquid crystal layer having liquid crystal molecules, and at least a pixel disposed on the second substrate. The pixel includes pluralities of sub-pixels arranged side by side along a first direction. Each sub-pixel has a first azimuthal angle domain and a second azimuthal angle domain, wherein the first and second azimuthal angle domains are arranged side by side along a second direction in the sub-pixel, and the second direction is not parallel with the first direction. The azimuthal angles of liquid crystal molecules in the first and second azimuthal angle domains have an included angle less than 180°.

44 Claims, 22 Drawing Sheets

DUAL-IMAGE FLAT DISPLAY DEVICE

BACKGROUND OF THE INVENTION

1. Field of the Invention

The present invention relates to a dual-image flat display device, and more particularly, to a dual-image flat display device only comprising a single display panel.

2. Description of the Prior Art

With technology development, liquid crystal display devices have been widely applied to various kinds of electric appliances, consumer products and information products, which provide more convenient and colorful display images and interfaces. In order to cater for the demand for a variety of display products in the market, the industry begins on developing a single display device that concurrently shows two or more image pictures (or image frames). Taking a flat television for instance, Picture-In-Picture (PIP) or Picture-Out-Picture (POP) technology has been developed currently and can display different image pictures on the same television screen, such as enabling the television screen to display a main image picture with a full-screen size and display a minor image picture with a small size, which is smaller than a quarter of full screen and positioned on the right-bottom corner of the television screen. Accordingly, different users would see the contents of the main image picture and the minor image picture according to personal favor or demand. However, under such design, a part of main image picture would be shielded by the minor image picture, and the minor image picture with much smaller size influences the clarity and integrality of the information received by viewers.

Thus, how to enable a single flat display device or a flat display panel to concurrently display two or different images with full-screen sizes so as to provide different image pictures for different viewers at the same time. The industry still can't successfully develop a concrete, feasible and low-cost structure of dual-image flat display and a practice method thereof until now.

SUMMARY OF THE INVENTION

One objective of the present invention is to provide a dual-image flat display device, which has a particular design of pixel structures, such that users would see different images within different viewing angle regions at the same time.

The present invention provides a dual-image flat device comprising a first substrate, a second substrate, a liquid crystal layer and at least a pixel, wherein the second substrate is disposed parallel and opposite to the first substrate while the liquid crystal layer is disposed between the first substrate and second substrate and the pixel is disposed on the second substrate. The pixel includes a plurality of sub-pixels arranged side by side along a first direction, and each of the sub-pixels includes a first azimuthal angle domain and a second azimuthal angle domain, wherein the first and second azimuthal angle domains are arranged side by side along a second direction in the sub-pixel. Besides, the included angle of the azimuthal angles of liquid crystal molecules in the first and second azimuthal angle domains is less than 180°, and the first direction is nonparallel to the second direction.

The present invention further provides a signal control method of a dual-image flat display device, wherein the dual-image flat display device includes a single flat display panel, which can include a plurality of first sub-pixels having a first viewing angle region and a plurality of second sub-pixels having a second viewing angle region. The first sub-pixels and the second sub-pixels are used respectively to concurrently display a first image and a second image, while the first and second images are respectively corresponding to a first image signal and a second image signal. The signal control method of the present invention includes following steps. A first light-leakage information generated by the first sub-pixel is in the second viewing angle region is firstly computed, and a second compensating signal of the first light-leakage information is computed in sequence. Then, the second compensating signal and the second image signal are calculated by addition to obtain a second correction signals transferred to the second sub-pixel to enable the second sub-pixel display a second correction image.

Due to two sub-pixels having two azimuthal angle domains disposed on each of the pixels of the present invention, the included angle of azimuthal angles of the liquid crystal molecules in the two azimuthal angle domains is less than 180°. According to the structure design of each of the pixels of the present invention, the brightness of the right and left viewing angles is infinite different so as to display different images respectively within different viewing angle regions of the display device. Besides, the present invention further provides a signal control method of a dual-image flat display device, which calculates the light-leakage information and the compensating signals thereof of different viewing angle regions of the sub-pixel to correct the image signal corresponding to each of the sub-pixels. The light-leakage images seen within each of the viewing angle regions can be efficiently improved such that users can see distinct and clear images without interference of other image signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
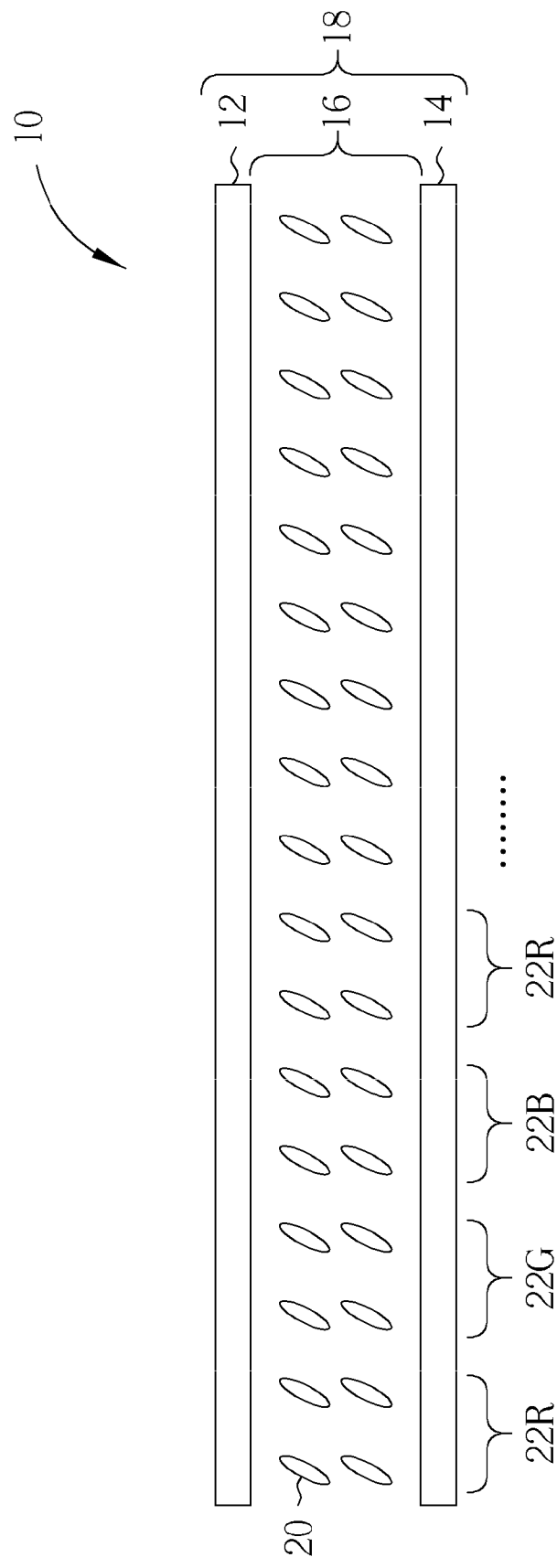
FIG. 1 is a schematic diagram showing a cross-sectional view of a dual-image flat display device of the present invention.

With reference to FIG. 1, FIG. 1 is a schematic diagram showing a cross-sectional view of a dual-image flat display device of the present invention. The dual-image flat display device 10, or named dual-view flat display device, which only includes a single flat display panel 18, may concurrently display dual image frames. The flat display panel 18 may be a vertical alignment liquid crystal display panel such as a multi-domain vertical alignment (MVA) liquid crystal display panel, which includes a first substrate 12, a second substrate 14 and a liquid crystal layer 16. The second substrate 14 is parallel and opposite to the first substrate 12, while the liquid crystal layer 16 including a plurality of liquid crystal molecules 20 is disposed between the first substrate 12 and the second substrate 14. A plurality of pixels 22 are defined on a surface of the second substrate 14, and a plurality of scan lines, signal lines and switch devices such as thin film transistors are disposed on the second substrate 14 (not shown in figure). The pixels 22 are at least divided into three kinds of pixels (or called sub-pixels) 22R, 22G, 22B, which are divided according to the corresponded colorful lights that composes display images and respectively correspond to red color filters, green color filters and blue color filters disposed on the first substrate 12 (not shown in figure). By virtue of control signals transferred through the scan lines and the signal lines to the sub-pixels 22R, 22G, 22B, the corresponding electric fields generated respectively therein enable the liquid crystal molecules 20 to rotate according to the electric-field strength and consequently to control the amount of light passing through the liquid crystal layer 16. Red light, green light and blue light are respectively generated while light goes through the red color filter, the green color filter and the blue color filter. Consequently, colorful images are generated.

Figure 2:
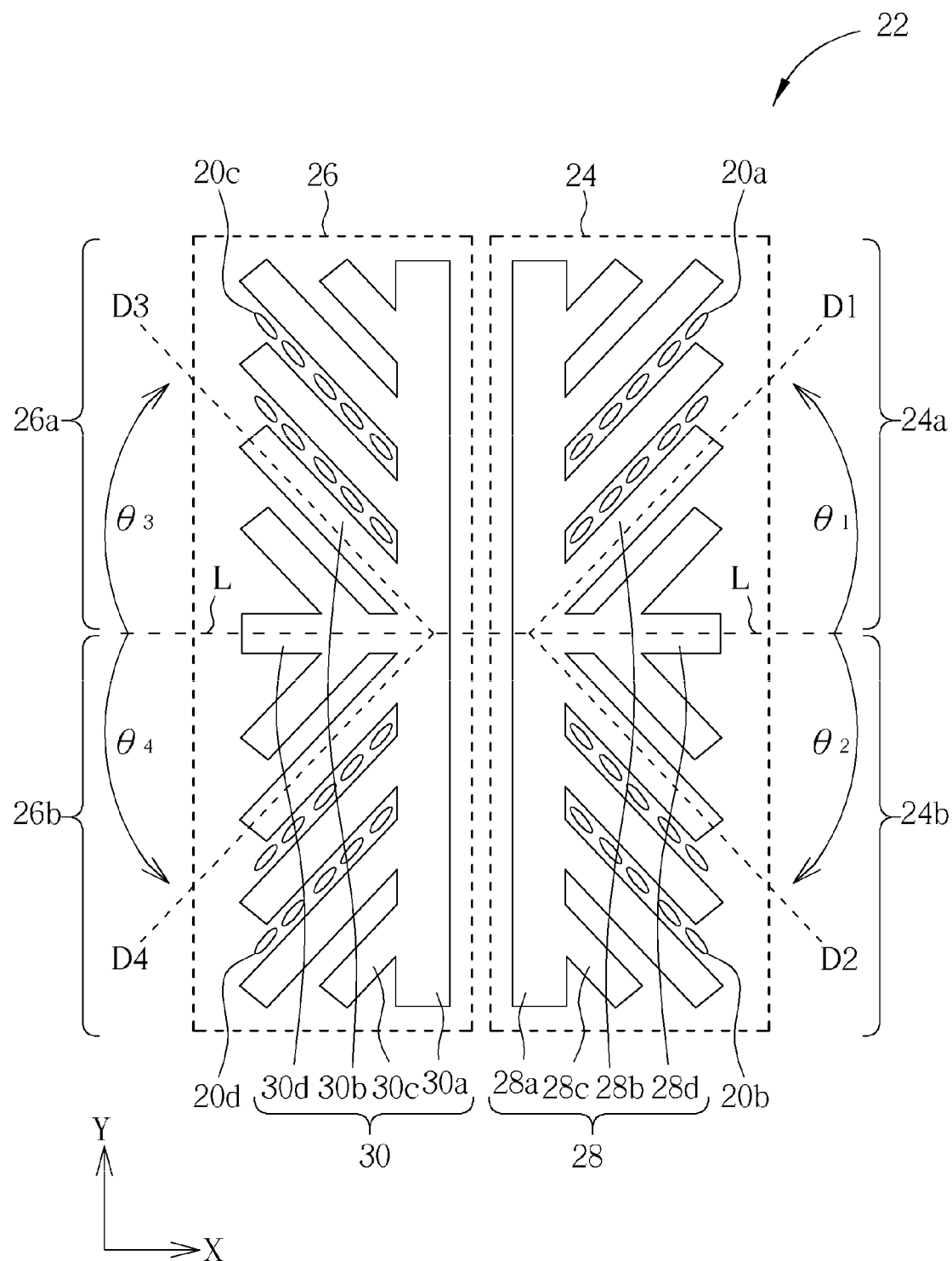
FIG. 2 is a schematic diagram showing a top view of a pixel structure of FIG. 1 while an electric voltage is applied on each sub-pixel.

With reference to FIG. 2, FIG. 2 is a schematic diagram showing a top view of the single pixel 22 shown in FIG. 1 while an electric voltage is applied on each sub-pixel. The pixel 22 includes a first sub-pixel 24 and a second sub-pixel 26 arranged side by side along a first direction such as direction X shown in figure. The first sub-pixel 24 includes a first azimuthal angle domain 24a and a second azimuthal angle domain 24b arranged side by side along a second direction such as direction Y shown in figure, wherein direction Y is perpendicular to direction X. A first pixel electrode 28, which is disposed in the first sub-pixel 24, includes a first pixel electrode trunk 28a, a plurality of first pixel electrode branches 28b parallel with each other, and a plurality of second pixel electrode branches 28c parallel with each other, wherein the first pixel electrode branches 28b are arranged parallel to a straight line D1 in the first azimuthal angle domain 24a while the second pixel electrode branches 28c are arranged parallel to a straight line D2 in the second azimuthal angle domain 24b, and the first pixel electrode branches 28b and the second pixel electrode branches 28c are all disposed on the right side of the first pixel electrode trunk 28a. The first pixel electrode trunk 28a at least includes a part parallel to direction Y, and a major part of the first pixel electrode branches 28b and a major part of the second pixel electrode branches 28c are connected to the first pixel electrode trunk 28a that is arranged along direction Y, while the first pixel electrode branches 28b and the second pixel electrode branches 28c are arranged mutually symmetrical along a straight line L (represented with broken line) in the first sub-pixel 24. It is therefore that the included angle $\theta_1$ of the straight line D1 and the straight line L is the same with the included angle $\theta_2$ of the straight line D2 and the straight line L, wherein the included angle $\theta_1$ and the included angle $\theta_2$ are in the range from about 40° to 50°. Accordingly, the included angle of the straight line D1 and the straight line D2 (sum of the included angle $\theta_1$ and the included angle $\theta_2$) is preferable in the range from about 80° to 100°. It is therefore that the included angle of the first pixel electrode branches 28b and the second pixel electrode branches 28c is in the range from about 80° to 100°. Moreover, the first pixel electrode trunk 28a further includes a pixel electrode lateral trunk 28d, which is connected to the centre part of the first pixel electrode trunk 28a and parallel to direction X. Accordingly, the first pixel electrode 28 has a shape with vertical symmetry (along direction Y) which is symmetrical to the symmetry line, the straight line L or the pixel electrode lateral trunk 28d.

Similarly, a second pixel electrode 30, which is disposed in the second sub-pixel 26, includes a second pixel electrode trunk 30a, a plurality of third pixel electrode branches 30b and a plurality of fourth pixel electrode branches 30c, wherein the second pixel electrode trunk 30a at least includes a part parallel to direction Y and the first pixel electrode trunk 28a and this part of the second pixel electrode trunk 30a is directly connected to most of the third pixel electrode branches 30b and most of the fourth pixel electrode branches 30c. Each of the third pixel electrode branches 30b is parallel with each other and arranged along a straight line D3 in the first azimuthal angle domain 26a, while each of the fourth pixel electrode branches 30c is arranged along a straight line D4 in the second azimuthal angle domain 26b. Herein, the included angle of the straight line D3 and the straight line D4 is preferable in the range from about 80° to 100°. It is therefore that the included angle of the third and the fourth pixel electrode branches 30b, 30c (sum of the included angle $\theta_3$ and the included angle $\theta_4$) is in the range from about 80° to 100°. Besides, the third pixel electrode branches 30b and the fourth pixel electrode branches 30c are disposed on the left side of the second pixel electrode trunk 30a. Similarly, the second pixel electrode trunk 30a may further includes a pixel electrode lateral trunk 30d, which is parallel to direction X and connected to the centre part of the second pixel electrode trunk 30a. Therefore, the second pixel electrode 30 has a shape vertically (along direction Y) symmetrical to the straight line L or to the pixel electrode lateral trunk 30d. Moreover, due to the included angle $\theta_1$ being in the range from about 40° to 50° and the included angle $\theta_3$ being in the range from about 40° to 50°, the included angle of the first pixel electrode branches 28b and the third pixel electrode branches 30b of the adjacent first and second sub-pixels 24 and 26 is in the range from about 100° to 80°. As shown in FIG. 2, the included angle $\theta_1$ is the same with the included angle $\theta_3$ while the included angle $\theta_2$ is the same with the included angle $\theta_4$. Therefore, the first pixel electrode 28 and the second pixel electrode 30 are horizontally (along direction X) symmetrical with a mirror symmetry shape.

The liquid crystal molecules in the first and second azimuthal angle domains 24a, 24b of the first sub-pixel 24 are respectively arranged along the first and the second pixel electrode branches 28b, 28c. To simplify the diagrams, FIG. 2 only illustrates a part of the liquid crystal molecules for explanation. As shown in FIG. 2, the liquid crystal molecules disposed in the first azimuthal angle domain 24a of the first sub-pixel 24 are denoted by numeral symbol 20a, and the liquid crystal molecules disposed in the second azimuthal angle domain 24b are denoted by numeral symbol 20b. The long axis of the liquid crystal molecules 20a, 20b are respectively parallel to the straight line D1 and the straight line D2, and consequently the azimuthal angles of the liquid crystal molecules 20a, 20b disposed respectively in the first and second azimuthal angle domains 24a, 24b are respectively the same as the included angle $\theta_1$ and the included angle (180°−$\theta_2$), such as in the range from 40° to 50° and in the range from 320° and 310° (or −40° to −50°) respectively. It is therefore that the included angle of the azimuthal angles of the liquid crystal molecules 20a, 20b is less than 180°, and the included angle ($\theta_1+\theta_2$) of the azimuthal angles of the liquid crystal molecules 20a, 20b, which are rotated resulted from variation of the electric field while a electric voltage is applied to the first sub-pixel 24, is about in the range from 80° to 100°. Similarly, the liquid crystal molecules of the first and second azimuthal angle domains 26a, 26b of the second sub-pixel 26 are respectively denoted by numeral symbols 20c, 20d, and the long axis of the liquid crystal molecules 20c, 20d are respectively arranged along the straight lines D3, D4. Therefore, the included angle of the azimuthal angles of the liquid crystal molecules 20c, 20d is the sum of the included angle $\theta_3$ and the included angle $\theta_4$ ($\theta_3+\theta_4$) which is in the range from about 80° to 100° while a electric voltage is applied.

Furthermore, since the first pixel electrode 28 has a shape with vertical symmetry symmetrical to the symmetry line L, the liquid crystal molecules 20a, 20b are as mirror symmetry symmetrical to the symmetry line L, too. Similarly, the liquid crystal molecules 20c, 20b of the first and second azimuthal angle domains 26a, 26b of the second sub-pixel 26 are arranged with mirror symmetry. It should be noted that although the first pixel electrode 28 and the second pixel electrode 30 are mirror-symmetrical to each other, as shown in FIG. 2, in other embodiment, the first pixel electrode 28 may be asymmetrical to the second pixel electrode 30. For instance, the included angle $\theta_1$ may be unequal to the included angle $\theta_3$, and the included angle $\theta_2$ may be unequal to the included angle $\theta_4$.

Figure 3:
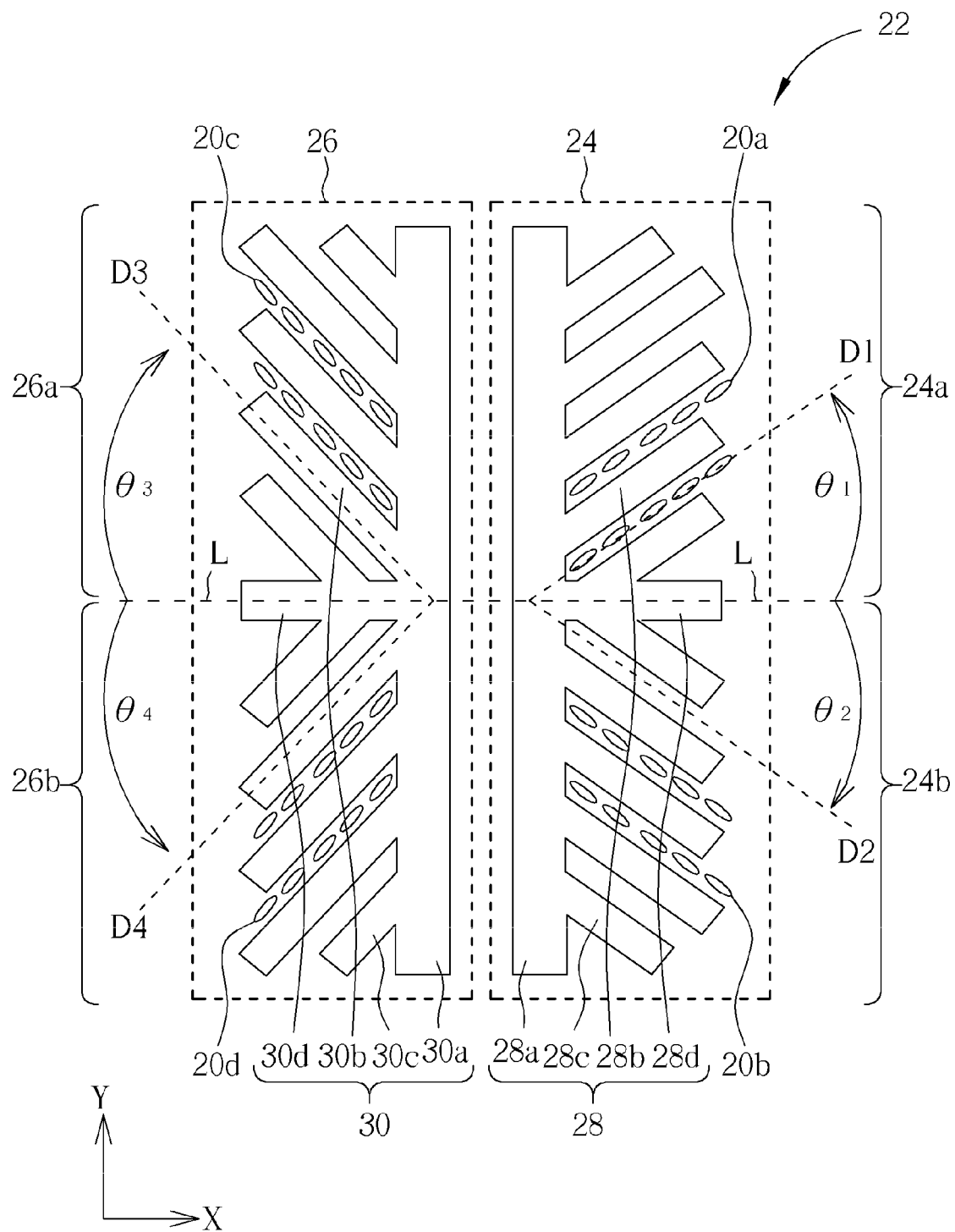
FIG. 3 is a schematic diagram showing a top view of another embodiment of a pixel structure of the present invention while an electric voltage is applied on each sub-pixel.

FIG. 3 is a schematic diagram illustrating another embodiment of the pixel structure of the present invention while an electric voltage is applied on each sub-pixel. To simplify description, the symbols of the device in FIG. 3 are identical to those already used in FIG. 2. In FIG. 3, both the included angle $\theta_1$ and the included angle $\theta_2$ are about 40°, and both the included angle $\theta_3$ and the included angle $\theta_4$ are about 50°. Accordingly, the included angle of the first pixel electrode branches 28b and the second pixel electrode branches 28c is about 80°, and the included angle of the third pixel electrode branches 30b and the fourth pixel electrode branches 30c is about 100°. The first pixel electrode 28 of the first sub-pixel 24 is asymmetrical to the second pixel electrode 30 of the second sub-pixel 26.

Figure 4:
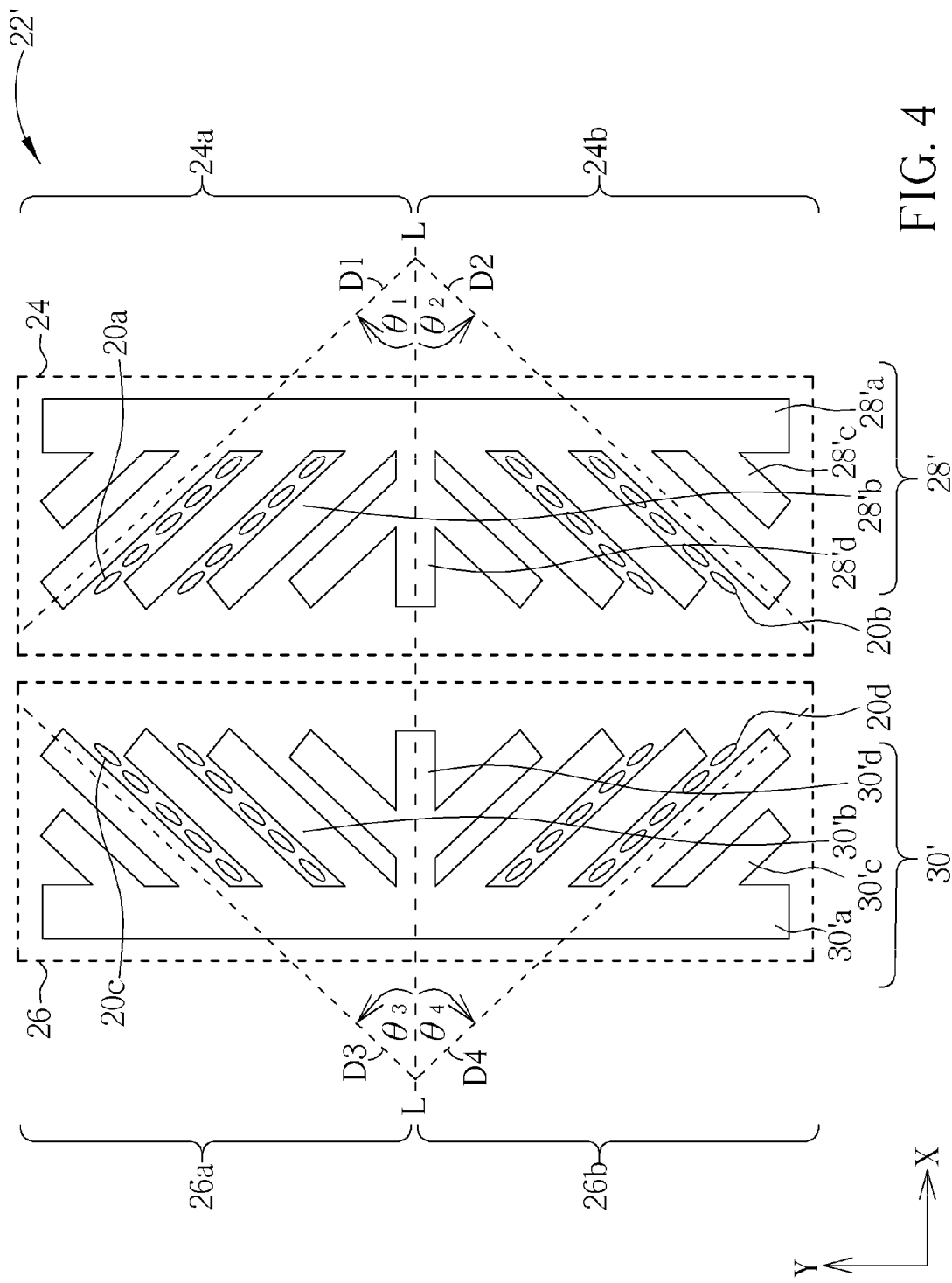
FIG. 4 is a schematic diagram showing the other embodiment of a pixel structure of the present invention while an electric voltage is applied on each sub-pixel.

With reference to FIG. 4, FIG. 4 is a schematic diagram illustrating another embodiment of the pixel structure of the present invention while an electric voltage is applied on each sub-pixel. The difference between the present embodiment and the embodiment shown in FIG. 2 is that the pixel electrode branches and the pixel electrode trunk are disposed at different positions in the sub-pixels. As shown in the figure, the first and second pixel electrode branches 28'b, 28'c and the third and fourth pixel electrode branches 30'b, 30'c are disposed between the first pixel electrode trunk 28'a and the second pixel electrode trunk 30'a in the same pixel 22'. It is therefore that both the first pixel electrode branches 28'b and the second pixel electrode branches 28'c are disposed on a left side of the first pixel electrode trunk 28'a, and both the third pixel electrode branches 30'b and the fourth pixel electrode branches 30'c are disposed on a right side of the second pixel electrode trunk 30'a. In brief description, the shapes of the first and second pixel electrodes 28', 30' of the present embodiment are like a mirror image with respect to the first and second pixel electrodes 28, 30 respectively illustrated in FIG. 2. Furthermore, the shape and arrangement of the first pixel electrode 28 illustrated in FIG. 2 are identical to those of the second pixel electrode 30' illustrated in FIG. 4, and the shape and arrangement of the second pixel electrode 30 illustrated in FIG. 2 are identical to those of the first pixel electrode 28' illustrated in FIG. 4, and the first pixel electrode 28' and the second pixel electrode 30' are arranged with mirror symmetry.

Figure 5:
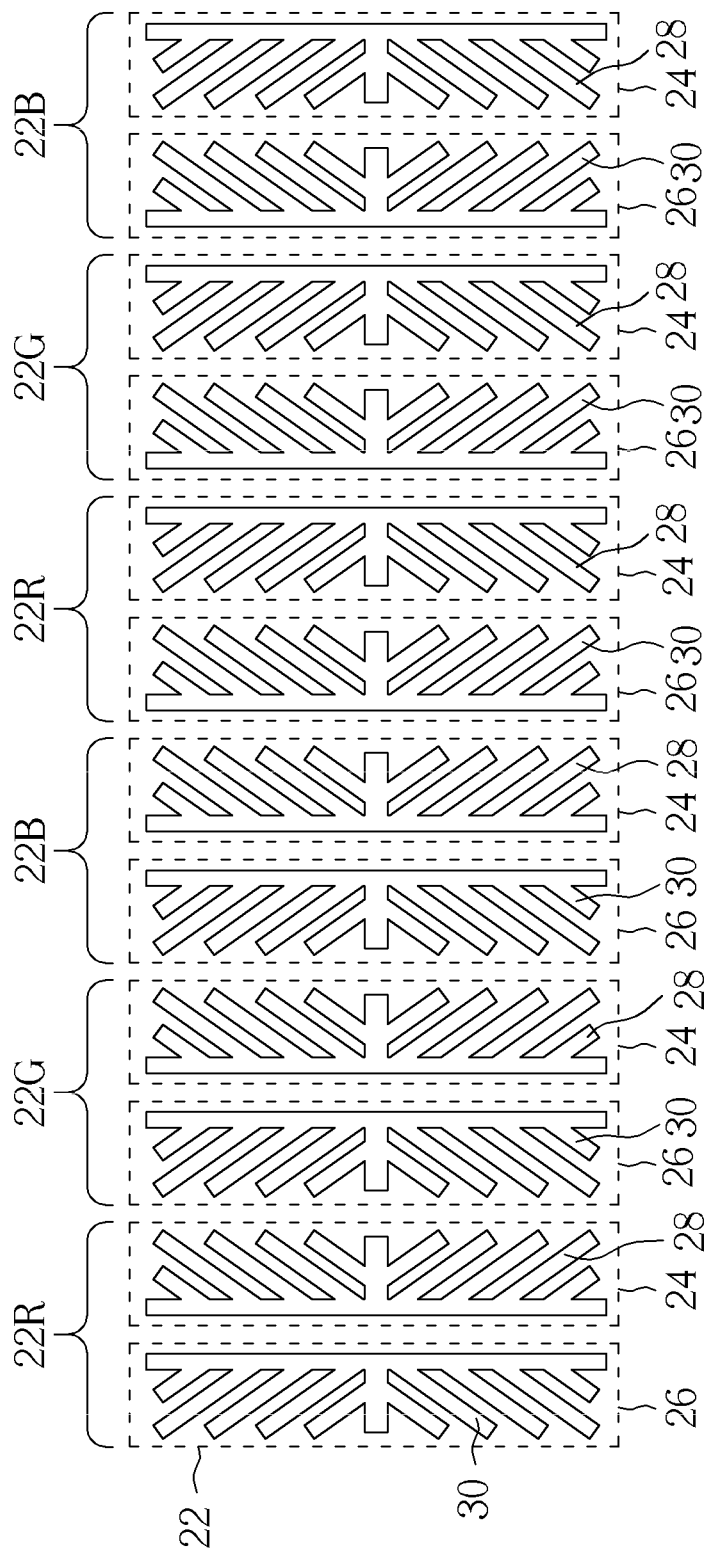
FIG. 5 is a schematic diagram showing the first embodiment of a plurality of pixels arranged side by side of a dual-image flat display device of the present invention.

FIG. 5 is a schematic diagram illustrating the arrangement of pixels of a dual-image flat display device of the first embodiment of the present invention. Generally speaking, the pixels 22 are arranged as a matrix or array and each of the pixels 22 is respectively controlled by a scan line and two signal lines (not shown in figure). The pixels 22R, 22G, 22B are alternately arranged side by side. In FIG. 5, the first and second pixel electrodes 28, 30 respectively in the first and second sub-pixels 24, 26 may include any kind or all kinds of shapes of the first and second pixel electrodes 28, 30, 28' 30' illustrated in FIG. 2 to FIG. 4, which are arranged alternately according to the design requirement. However, in other embodiments, all the first and second sub-pixel electrodes 28, 30 in all the pixels 22R, 22G, 22B may include only a kind of the aforementioned pixel electrode shape illustrated in FIG. 2 to FIG. 4 that are continuously arranged repeatedly.

Figure 6:
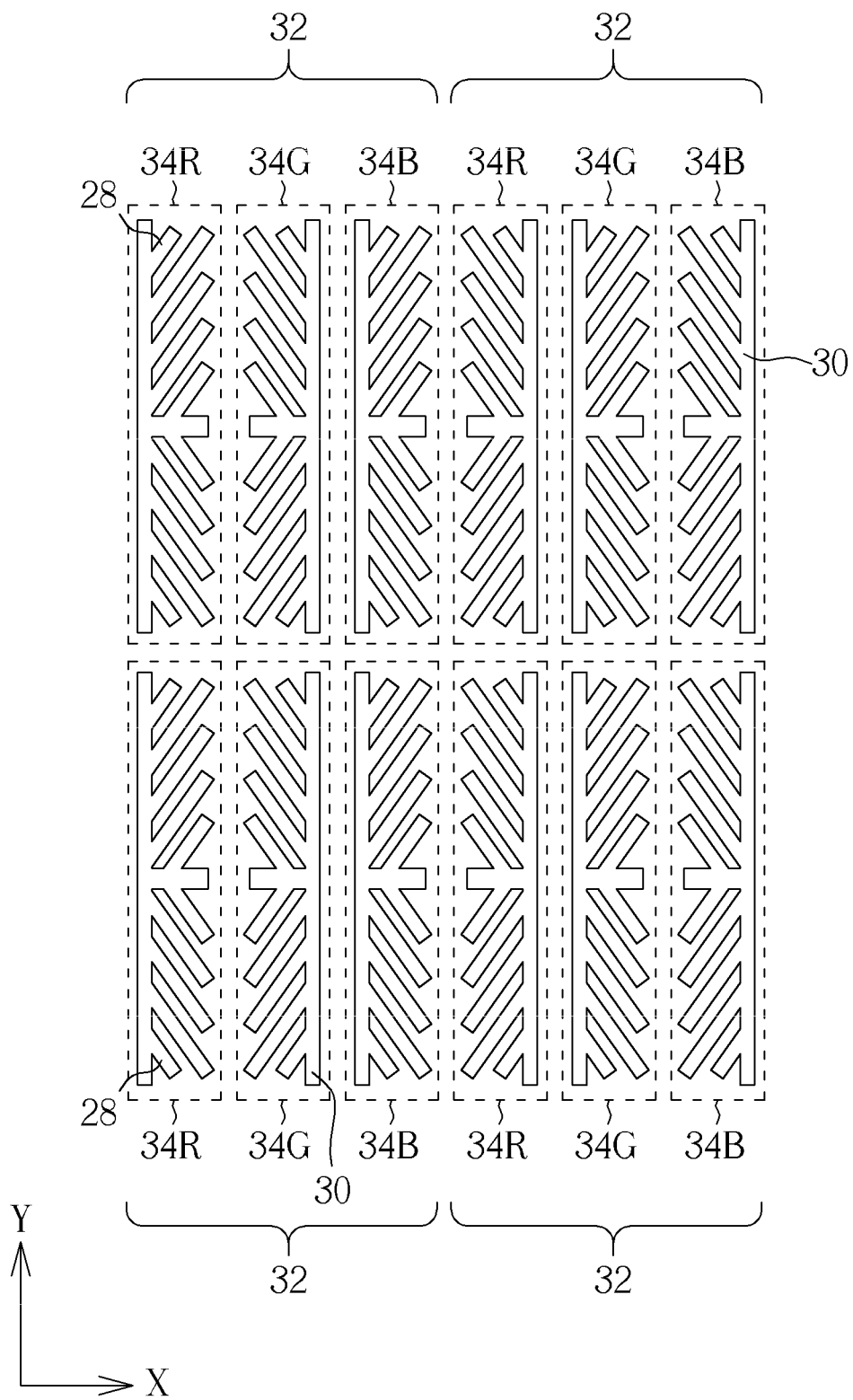
FIG. 6 to FIG. 16 are schematic diagrams showing the second to twelfth embodiments of the pixel structures of the present invention.

FIG. 6 to FIG. 16 are schematic diagrams illustrating the pixel arrangement of the dual-image flat display device of the second to twelfth embodiments of the present invention. As shown in FIG. 6, the dual-image flat display device of the present invention includes a plurality of pixels 32, while each of the pixels includes three sub-pixels 34R, 34G, 34B alternately arranged side by side along direction X. Herein, each of the sub-pixels 34R, 34G, 34B respectively stands for the sub-pixels respectively corresponding to red, green and blue filters for respectively generating red, green and blue lights. Besides, the sub-pixels 34R, 34G, 34B of different color light are respectively arranged in several straight lines along direction Y. Each of the sub-pixels 34R, 34G, 34B respectively includes one of the first pixel electrode 28 and the second pixel electrode 30 in aforementioned embodiments. Taking the first and second pixel electrodes 28, 30 as an example, the first pixel electrode trunk 28a of the first pixel electrode 28 is disposed on the left side of the first and second pixel electrode branches 28b, 28c, and the second pixel electrode trunk 30a of the second pixel electrode 30 is disposed on the right side of the third and fourth pixel electrode branches 30b, 30c. In this embodiment, the first and second pixel electrodes 28, 30 are sequentially and alternately disposed along direction X. Therefore, each of the sub-pixels 34R, 34G, 34B may include the first pixel electrode 28 or the second pixel electrode 30. Furthermore, the first pixel electrodes 28 and the second pixel electrodes 30 are respectively arranged in a plurality of straight lines along direction Y. Accordingly, the first and second pixel electrodes 28, 30 adjacent to each other may be considered as a unit that are continuously and repeatedly arranged along direction X and direction Y, and the first and second pixel electrodes 28, 30 in each unit may be respectively corresponding to the same or different color filters.

Figure 7:
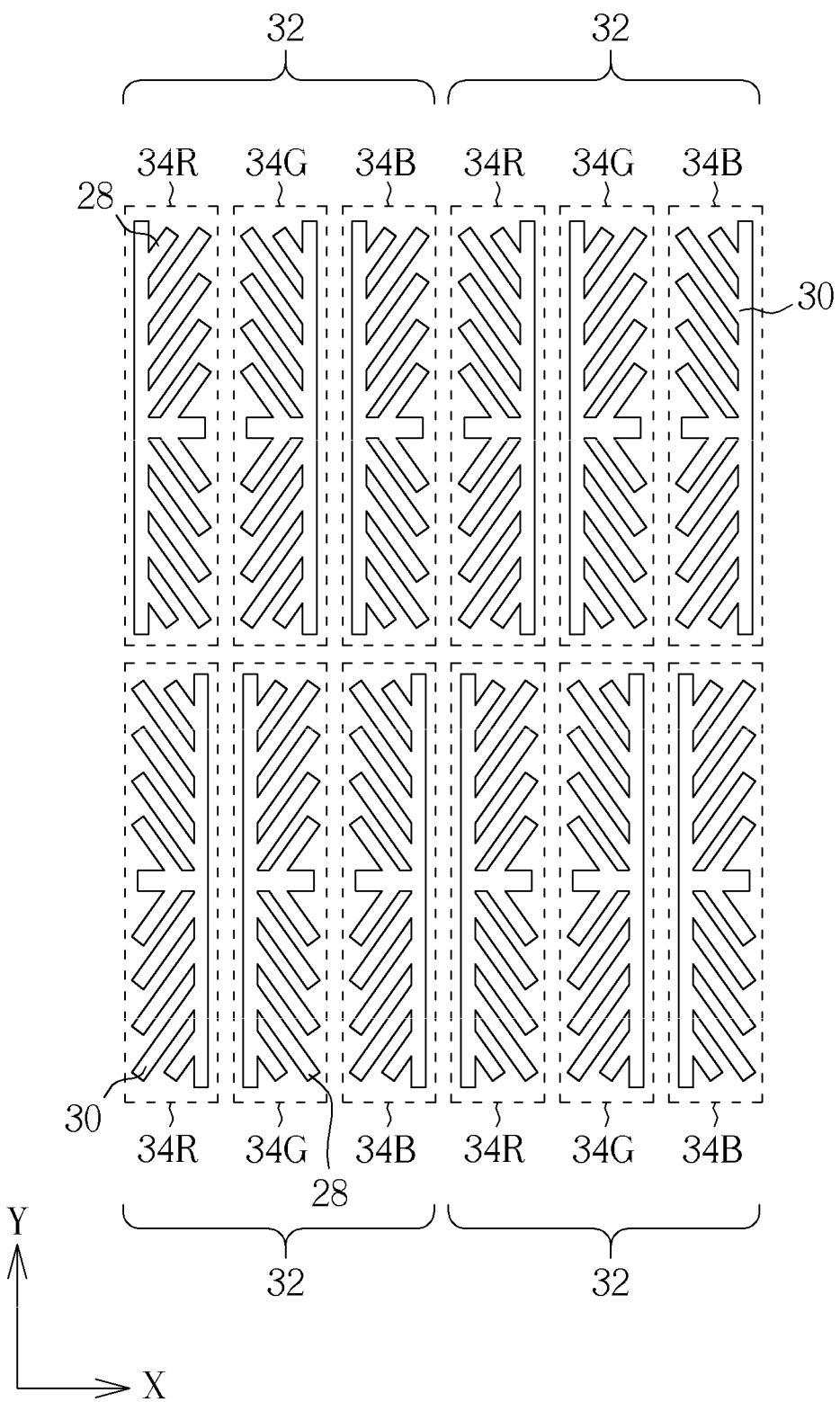
Figure 8:
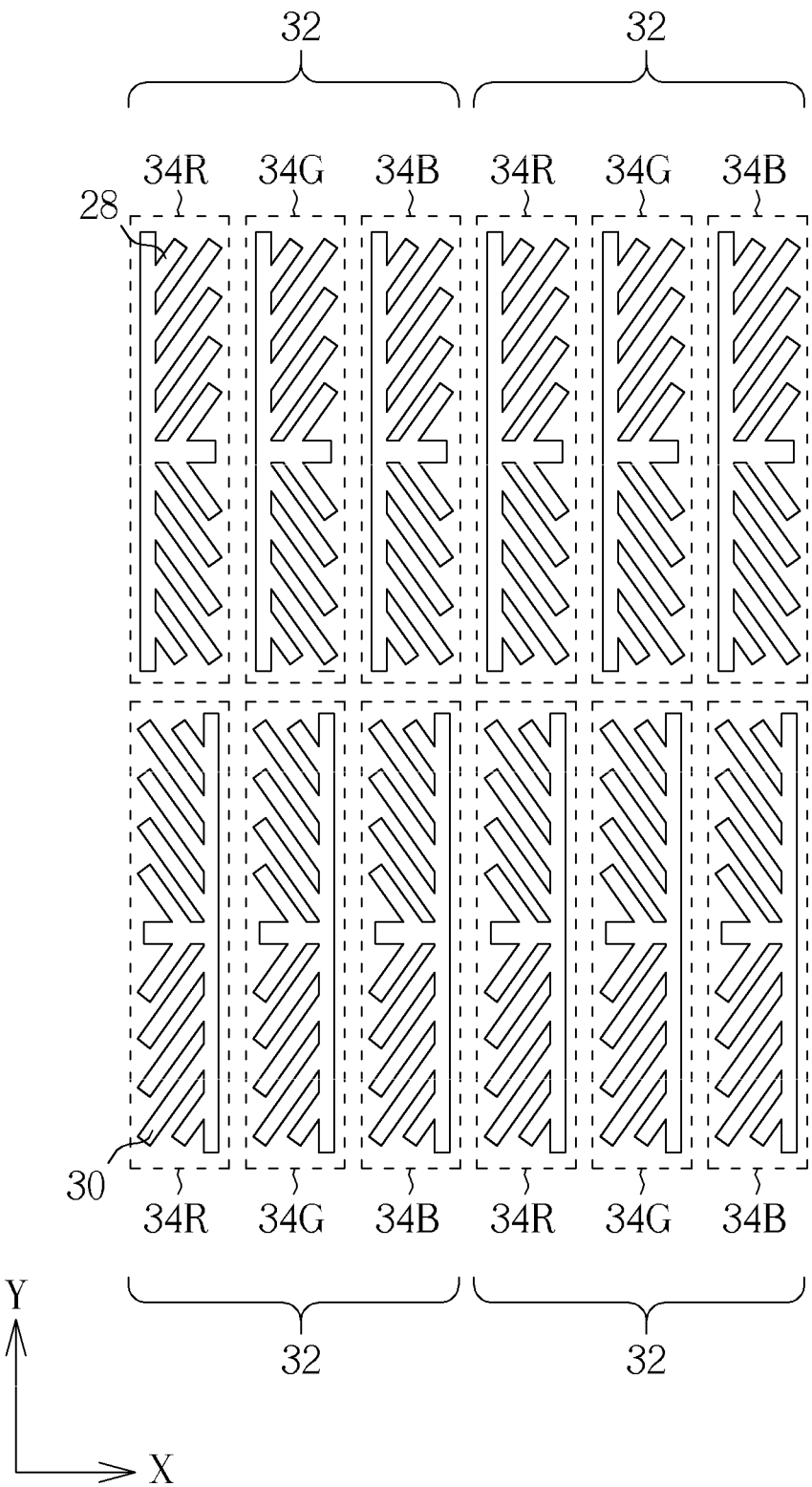

With reference to FIG. 7, the difference between the present embodiment and that illustrated in FIG. 6 is that the first pixel electrode 28 and the second pixel electrode 30 are arranged alternately side by side along both direction Y and direction X, and accordingly any one of the first pixel electrodes 28 is disposed adjacent to several second pixel electrodes 30. The fourth embodiment of the pixel arrangement of the dual-image flat display device of the present invention is illustrated in FIG. 8, wherein the first pixel electrodes 28 and the second pixel electrodes 30 are respectively arranged in several straight lines along direction X, and the first pixel electrodes 28 and the second pixel electrodes 30 are arranged alternately side by side along direction Y. Each kind of the first pixel electrodes 28 and the second pixel electrodes 30 may be respectively corresponding to different or the same color filters.

Figure 9:
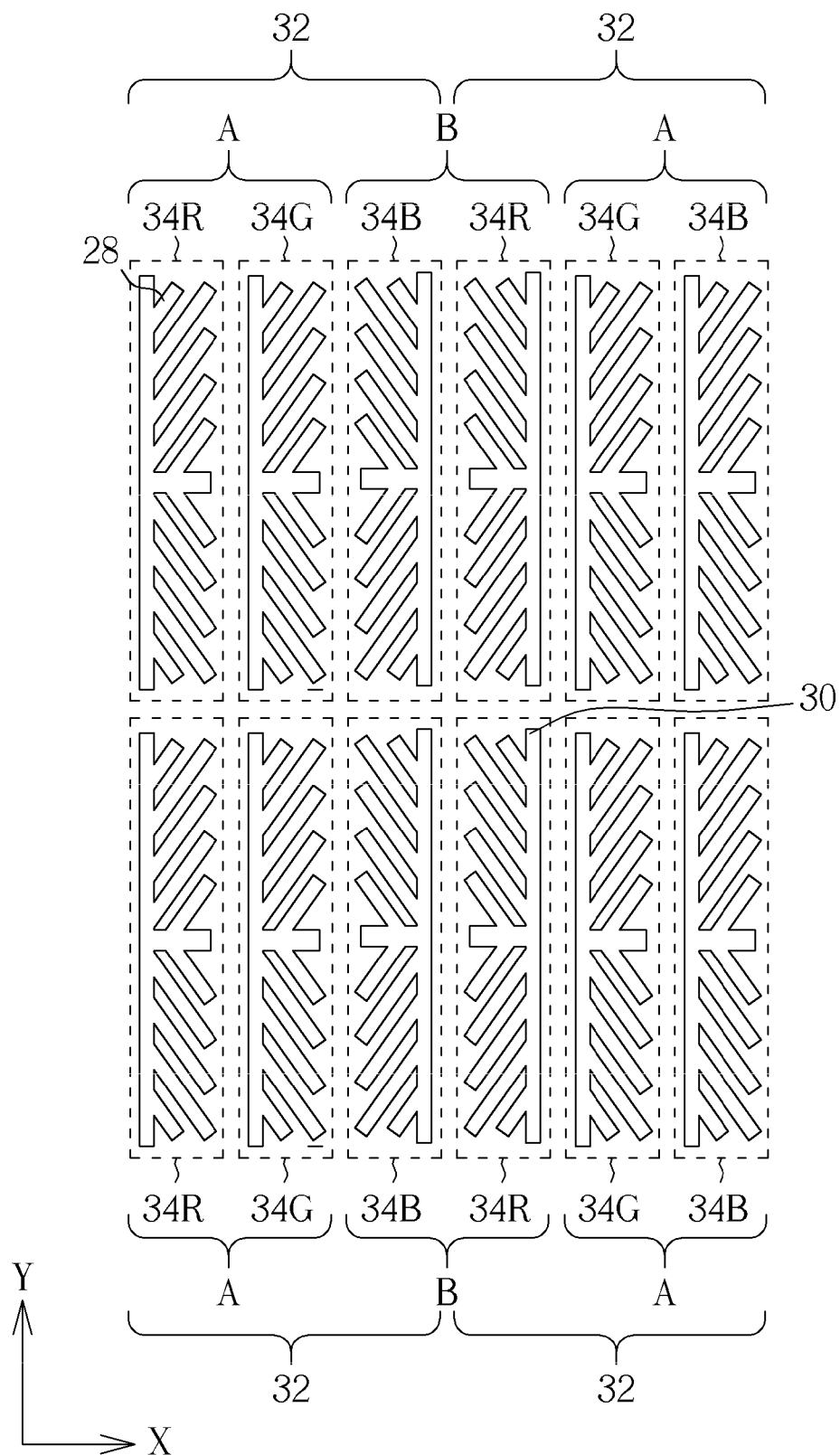
Figure 10:
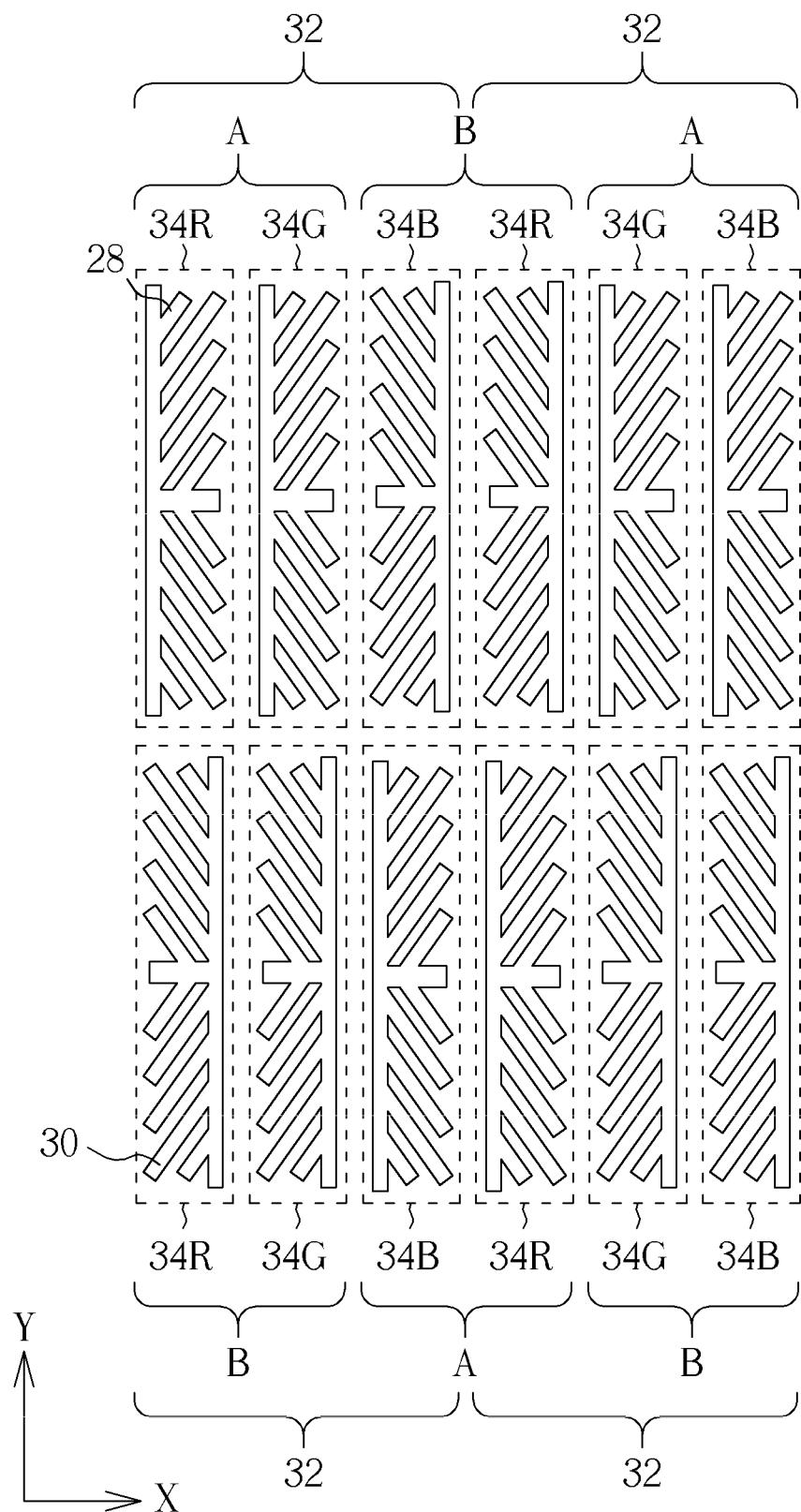
Figure 11:
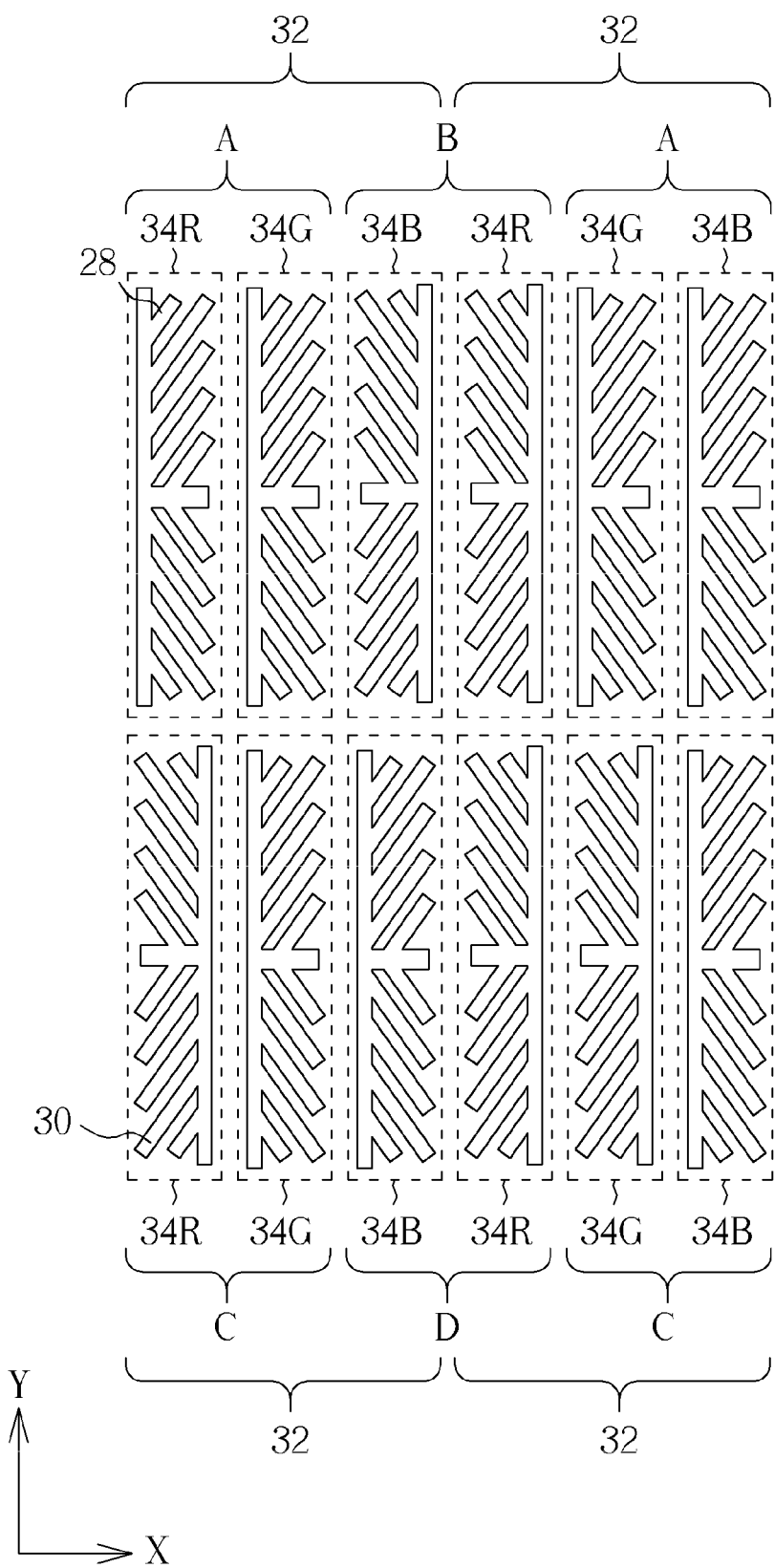

With reference to FIG. 9 and FIG. 10 in the fifth and sixth embodiments of the pixel arrangement of the present invention, a plurality of same pixel electrodes adjacent to each other are considered as one unit for arranging the pixels. For example, unit A may include two first pixel electrodes 28 adjacent to each other, and unit B may include two second pixel electrodes 30 adjacent to each other. The units A and units B are arranged alternately along direction X, and the units A and units B are arranged periodically or alternately along direction Y. Speaking in detail, as shown in FIG. 9, along direction X, each unit A and unit B neighbor with each other; along direction Y, each unit A is adjacent to another unit A while each unit B is adjacent to another unit B. However, the pixel arrangement along direction Y may be designed as FIG. 10, wherein the units A and units B are arranged periodically and alternately along direction Y. Speaking in detail, the arrangement along direction Y is identical to that along direction X. It is therefore that what neighbors with each unit A is unit B, while what neighbors with each unit B is unit A. FIG. 11 illustrates the seventh embodiment of the present invention, wherein the pixel arrangement along direction X is the same with those shown in the fifth and sixth embodiments, thus related detail description will not be provided herein. The difference is that the arrangement along direction Y is not based on unit A and unit B but the first pixel electrodes 28 and the second pixel electrodes 30 are arranged alternately or arranged adjacent to another identical pixel electrode repeatedly. In detail, in direction Y, for instance, one first pixel electrode 28 may neighbor the first pixel electrode 28 or the second pixel electrode 30. In other words, in addition to the unit A and unit B, the present embodiment may be considered as further including unit C and unit D. Herein, both the unit C and unit D consist of a first pixel electrode 28 and a second pixel electrode 30 adjacent to each other. The difference of the unit C and unit B is that the unit C has the characteristic as shown in FIG. 2 of the present invention, while the unit D has the characteristic shown in FIG. 4. The units A and B and the units C and unit D are periodically arranged in different rows with respect to direction Y respectively, wherein the lines consisting of the units A and B and the lines consisting of the units C and D are arranged adjacent with each other along direction X. In addition, in the fifth to seventh embodiments of the present invention, the first and second pixel electrodes 28, 30 may respectively correspond to different or the same color filters. On the other hand, the pixel arrangement may be considered that the units A and units B are arranged adjacent to each other in different rows along direction X, while any two adjacent units A or any two adjacent units B with respect to direction Y are periodically arranged with a position shift with one sub-pixel in turn.

Figure 12:
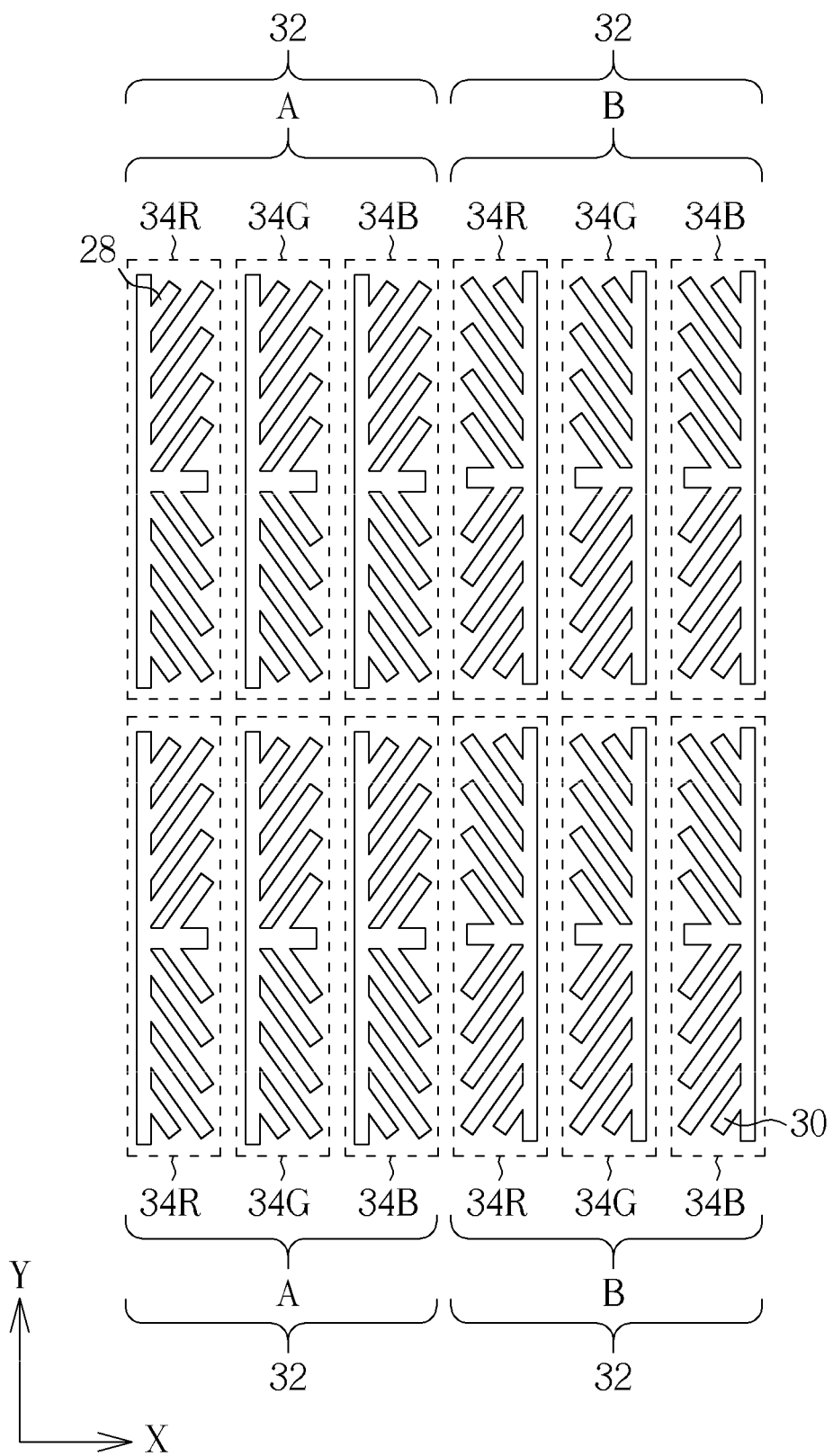
Figure 13:
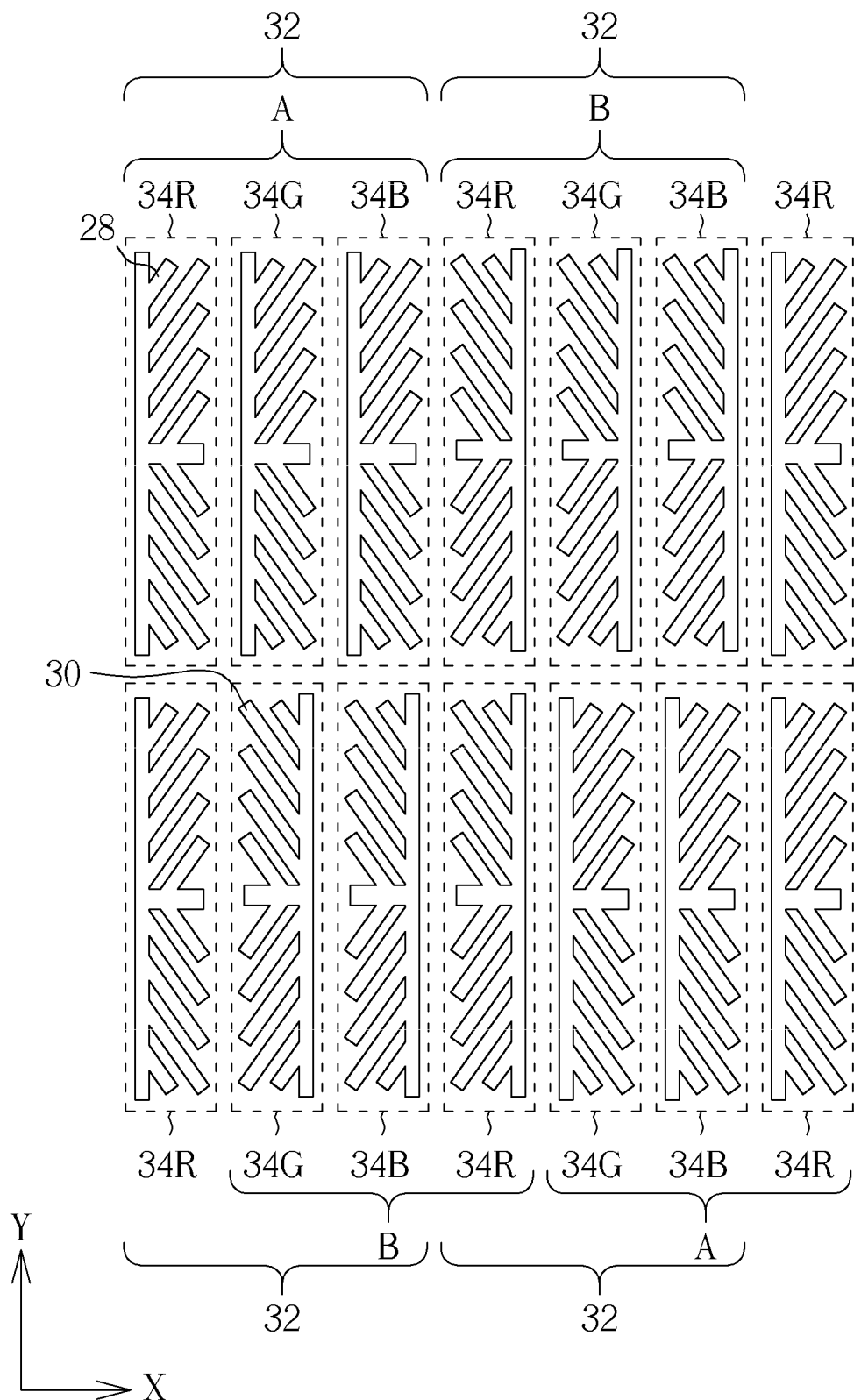
Figure 14:
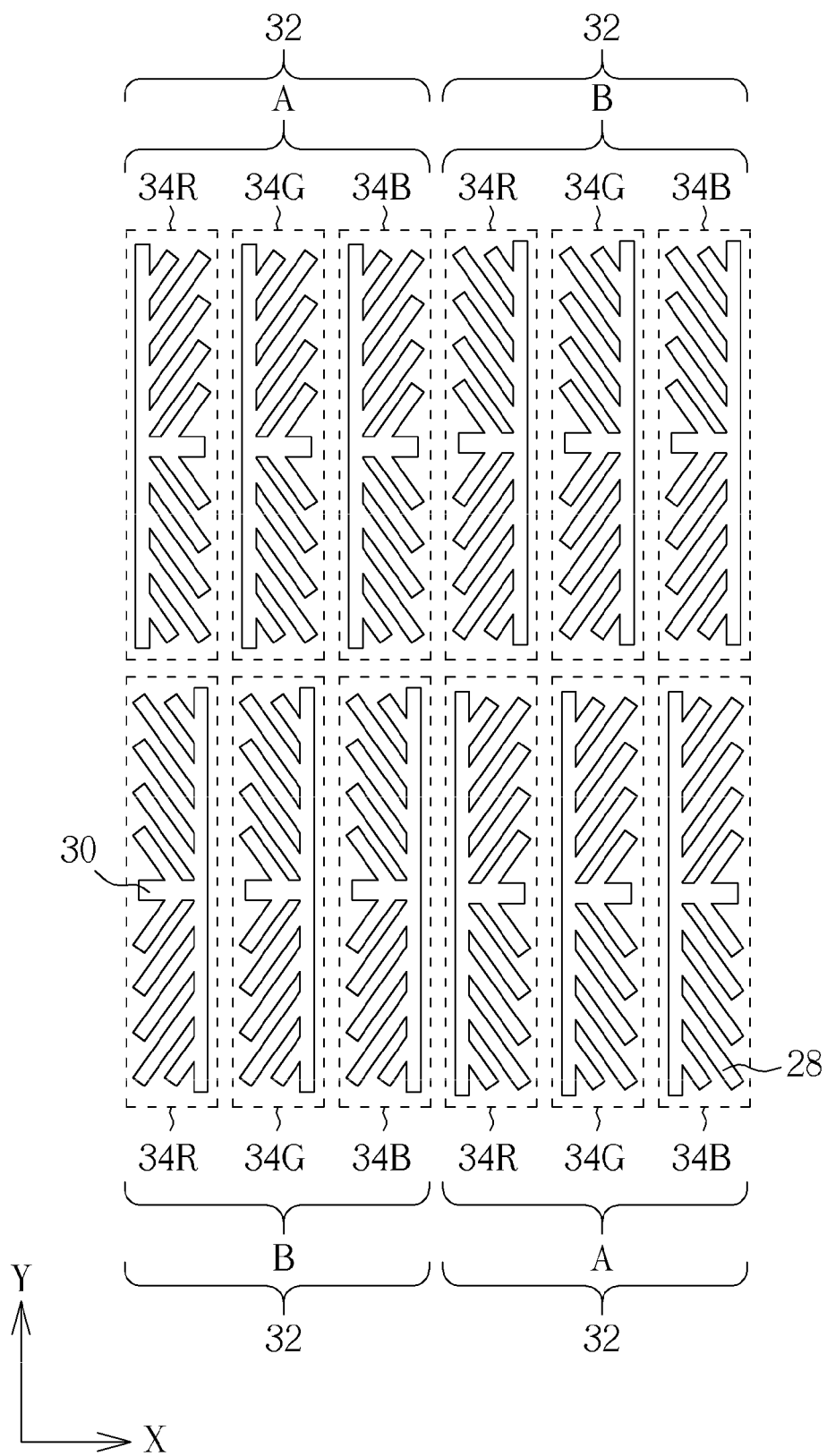

FIG. 12 to FIG. 14 show the eighth to tenth embodiments of the pixel arrangement of the present invention. The pixel electrode arrangements are conjointly composed of a first kind of units formed with a plurality of same pixel electrodes adjacent to each other and a second kind of units formed with a plurality of another shape of pixel electrodes adjacent to each other. For instance, three continuous first pixel electrodes 28 arranged side by side called unit A and three continuous second pixel electrodes 30 arranged side by side called unit B are arranged periodically and alternately along direction X. In the eighth embodiment shown in FIG. 12, the units A and units B are mutually arranged alternately along direction X. In the ninth embodiment shown in FIG. 13, although the units A and units B are alternately arranged along direction X, the units A and units B in adjacent two rows with respect to direction Y are alternately and periodically arranged with a position shift of a sub-pixel in turn along direction X. With reference to FIG. 14, the units A and units B are arranged periodically and alternately both along direction X and direction Y. It is therefore that any unit A neighbors units B along direction X or direction Y, and vice versa.

Figure 15:
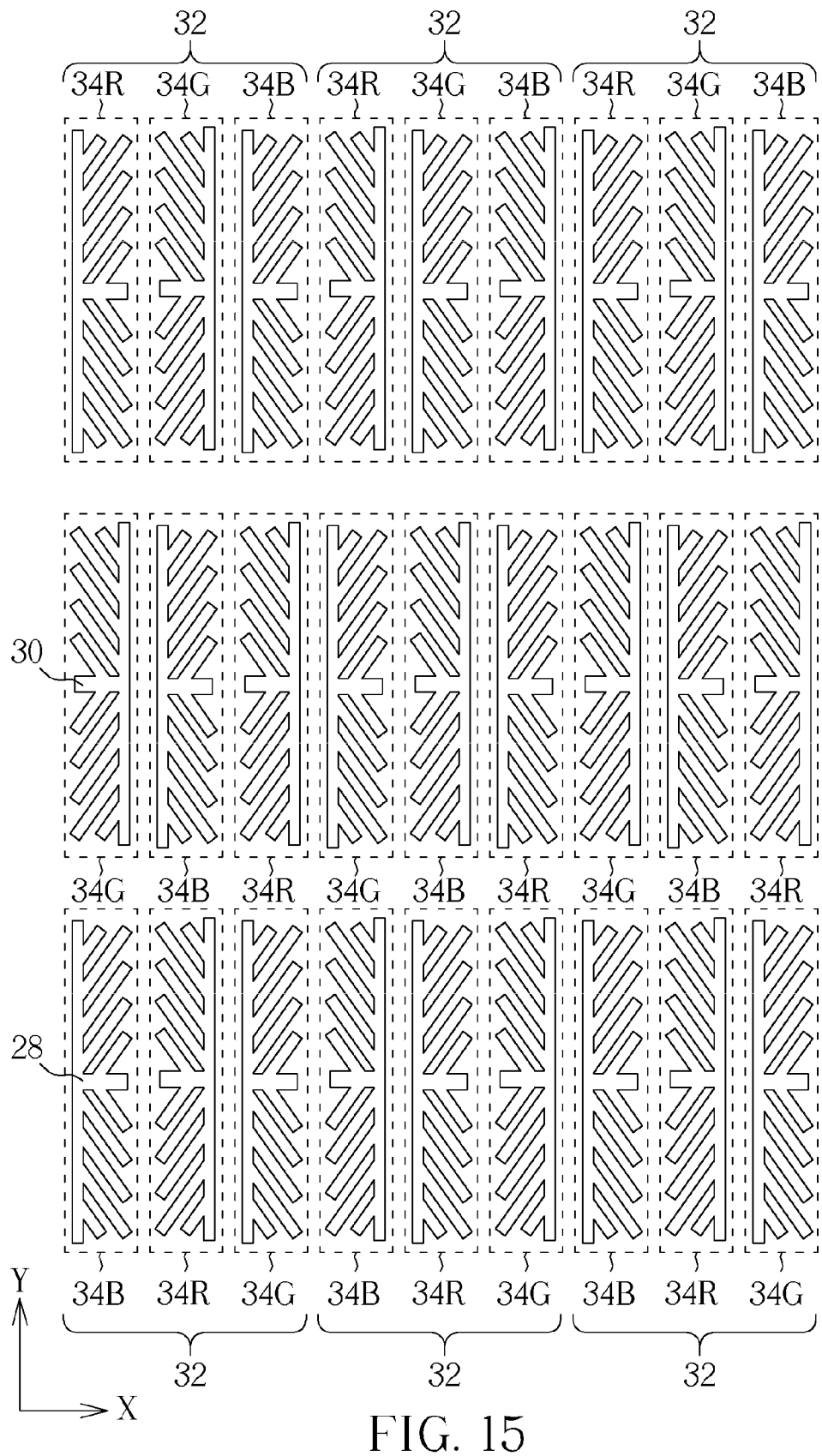

With reference to FIG. 15, the difference between the eleventh embodiment of the present invention and the fore-mentioned embodiment is that the sub-pixels 34R, 34G, 34B is periodically and alternately arranged along direction X and direction Y. Consequently, each sub-pixel 34R is disposed adjacent to two sub-pixels 34B and adjacent to two sub-pixels 34G. Besides, the first and second pixel electrodes 28, 30 are alternately arranged side by side in the sub-pixels 34R, 34G, 34B along direction X and direction Y. Accordingly, each of the second pixel electrodes 30 are adjacent to four first pixel electrodes 28 side by side. Concretely speaking, what neighbors with the first pixel electrode 28 vertically and horizontally is the second pixel electrode 30, while what neighbors with the second pixel electrode 30 vertically and horizontally is the first pixel electrode 28.

Figure 16:
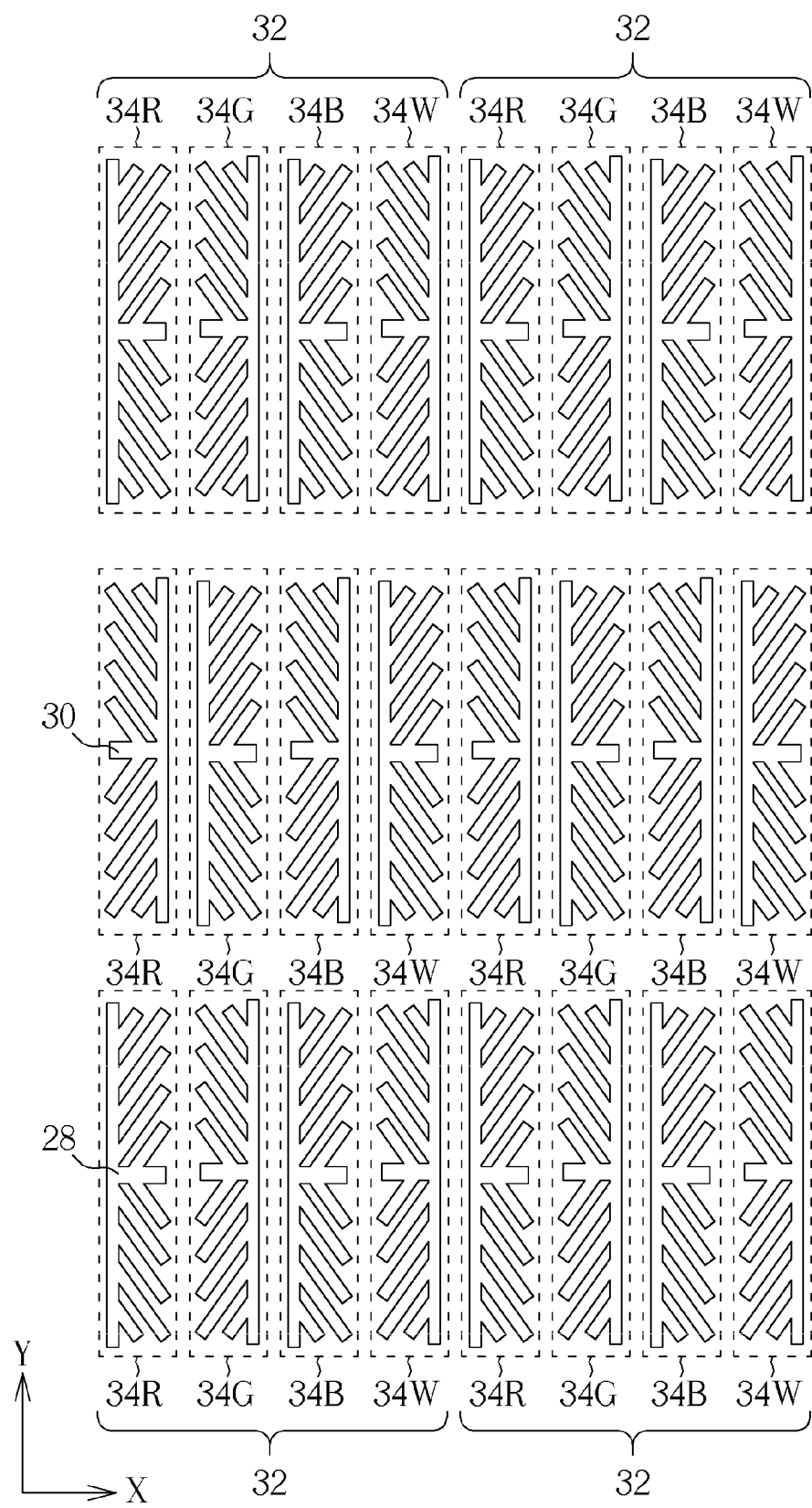

FIG. 16 is a schematic diagram illustrating the twelfth embodiment of the pixel arrangement of the dual-image flat display panel device of the present invention. The present embodiment of the dual-image flat display device includes a plurality of pixels 32, and in addition to the sub-pixels 34R, 34G, 34B, each of the pixels 32 may further includes a sub-pixel 34W. Herein, the sub-pixel 34W serves as the sub-pixel to provide white light that corresponds to a transparent color filter. The sub-pixels 34R, the sub-pixels 34G, the sub-pixels 34B, and the sub-pixels 34W are respectively arranged in a plurality of straight lines along direction Y and are arranged alternately and periodically along direction X. On the other hand, as the arrangement shown in FIG. 15, the first pixel electrodes 28 and the second pixel electrodes 30 of the present embodiment are arranged in the sub-pixels 34R, 34G, 34B, or 34W alternately and periodically along direction X and direction Y. Accordingly, each of the first pixel electrodes 28 is adjacent to four second pixel electrodes 30 side by side. Concretely speaking, what neighbors with the first pixel electrode 28 vertically and horizontally is the second pixel electrode 30, and what neighbors with the second pixel electrode 30 vertically and horizontally is the first pixel electrode 28.

It should be noted that the pixel arrangement of the dual-image flat display device of the present invention is not limited to the above-disclosed embodiments. All kinds of designs that a single sub-pixel has two azimuthal angle domains, resulted from the patterns or shapes of the pixel electrode shapes or the disposition of alignment devices, to enable the included angle of azimuthal angles of the liquid crystal molecules in the two azimuthal angle domains to be less than 180° in cooperation with the design of pixel arrangement of the sub-pixels representing red, blue, green, white or other color lights should belong to the field of the present invention.

With reference to FIG. 2, since each of the pixels 22 of the dual-image flat display device 10 of the present invention at least comprises two independent first and second sub-pixels 24, 26 that are respectively controlled by different signal lines and the same scan line, each of the signal lines consequently provides the first and second image signals to the first and second sub-pixels 24, 26 respectively, such that the first and second sub-pixels 24, 26 can produce different image pictures or frames at the same time to enable users to see these two image pictures in different viewing angle regions. The signal control method and the operation theory thereof are described as follows.

Figure 17:
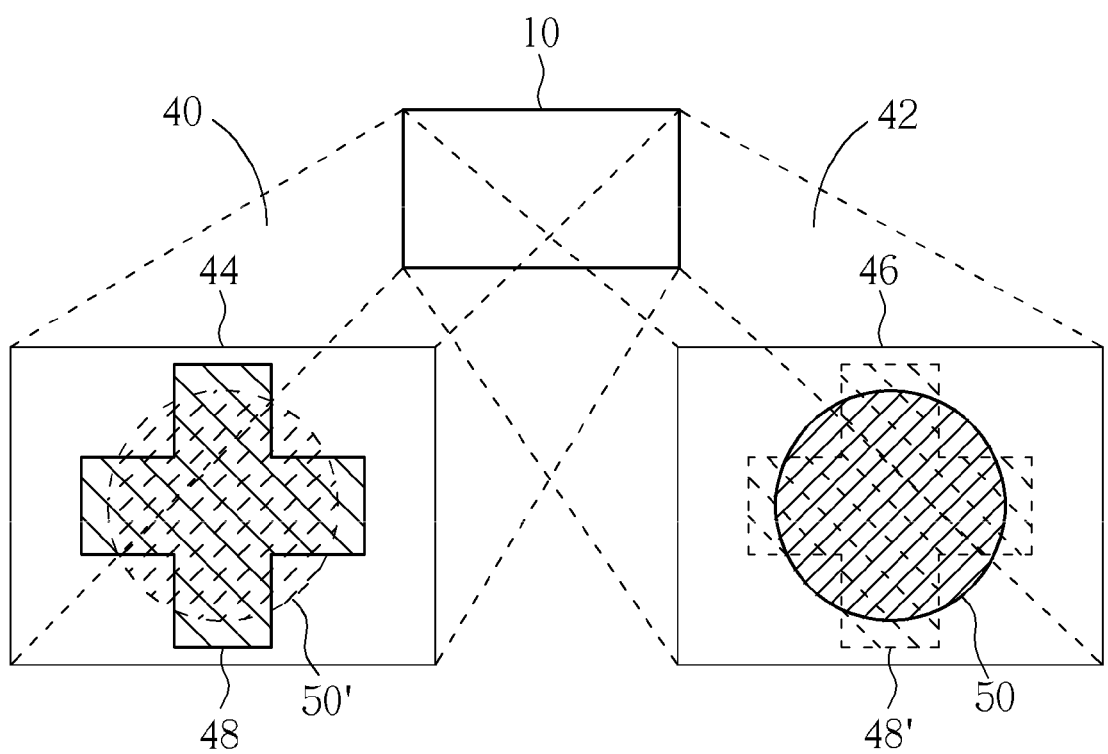
FIG. 17 is a schematic diagram showing the image pictures without performing any compensating signal operation of a dual-image flat display device of the present invention.

FIG. 17 is a schematic diagram illustrating image pictures without signal-compensating operation of the dual-image flat display device 10 of the present invention. As illustrated in FIG. 17, since the dual-image flat display device 10 has the first and second sub-pixels 24, 26, different and independent image pictures 44, 46 are displayed respectively in the first viewing angle region 40 and the second viewing angle region 42. For instance, the image picture 44 includes a first image 48 having the symbol "+", and the image picture 46 includes a second image 50 having the symbol "o". Herein, the first image 48 and the second image 50 are respectively corresponding to the first image signal P1 and the second image signal P2. However, under the situation that the first image signal P1 and the second image signal P2 are unprocessed, both the first image 48 and the second image 50 have light-leakage phenomena respectively, which results in a first light-leakage image 48' and a second light-leakage image 50' respectively in the image picture 46 and the image picture 44 within the second viewing angle region 42 and the first viewing angle region 40. Accordingly, the interference formed in both the first and second viewing angle regions 40, 42 influences the clarity of the image pictures 44, 46.

Figure 18:
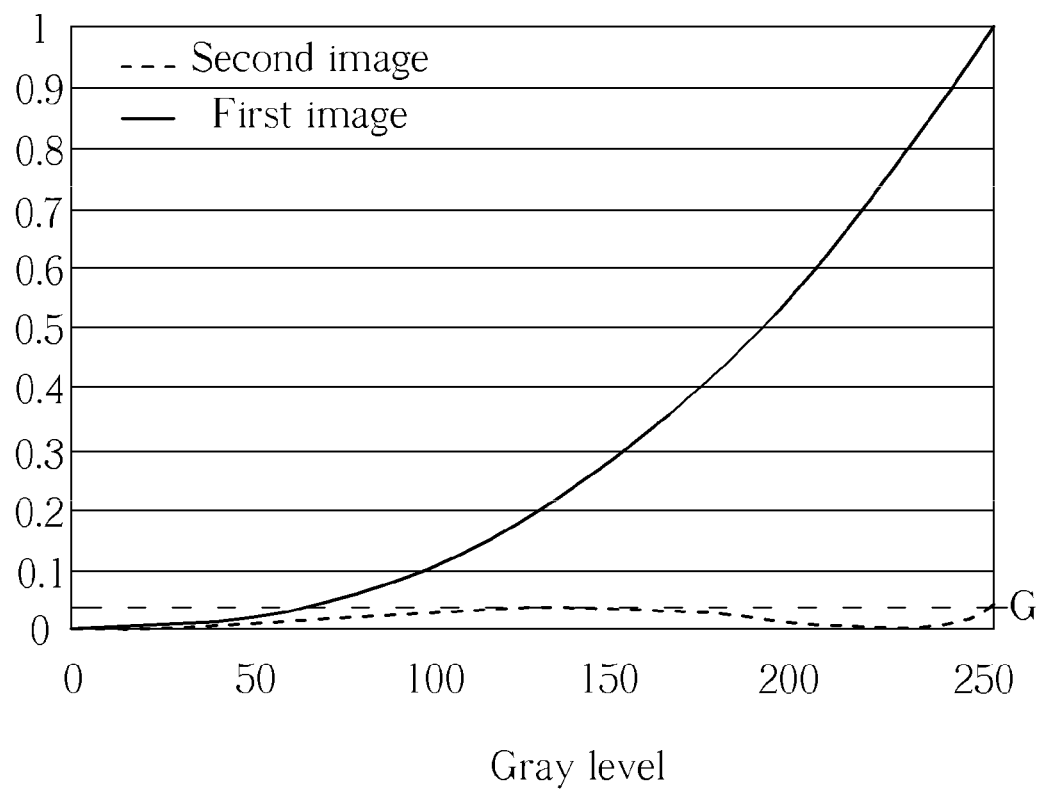
FIG. 18 is a gamma curve (γ curve) without performing any compensating signal operation of a dual-image flat display device.

Taking the image picture 44 at the left side of FIG. 17 for illustration, FIG. 18 shows the gamma curve plot of the image picture 44. Knowing from the figure, in the image picture 44, although the visible luminance of the second image 50 is very low, the light-leakage information of the second image 50, which is shown as the second light-leakage image 50', still can be seen in some degree or measure because of light-leakage problem. Consequently, in order to reduce the influences resulting from the first and second light-leakage images 48', 50' upon the image pictures 46, 44 within the second and first viewing angle regions 42, 40 respectively, the present invention provides a signal control method of the dual-image flat display device 10. According to the signal control method of the present invention the light-leakage information respectively corresponding to the first light-leakage image 48' and the second light-leakage image 50' are respectively subtracted from an all gray level information, as the broken line G illustrated in FIG. 18 for providing the complementary signals of the first and second light-leakage images 48', 50' respectively and further improving the quality of the eventually generated image pictures.

Figure 19:
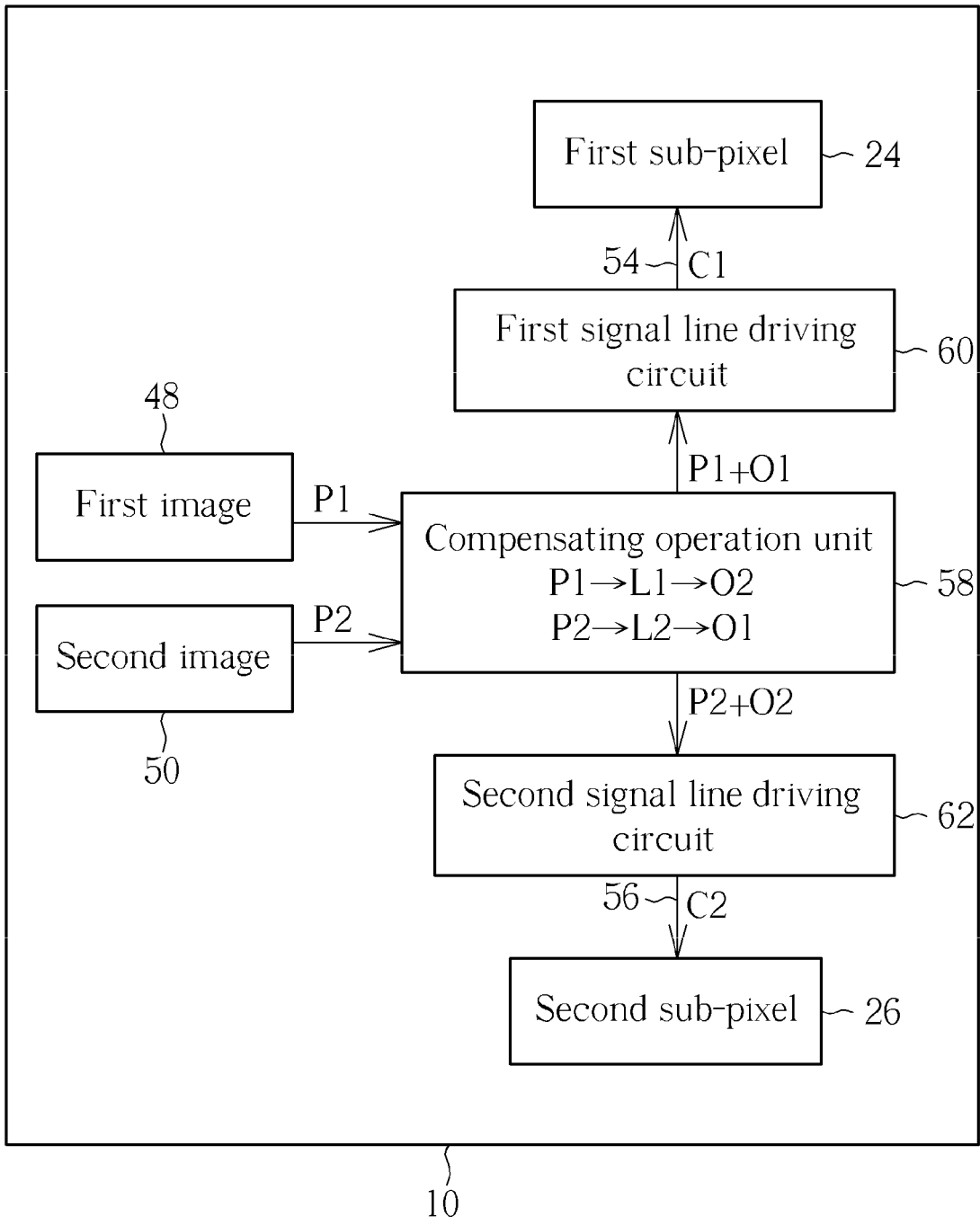
FIG. 19 is a functional block of a signal control method of a dual-image flat display device of the present invention.
Figure 20:
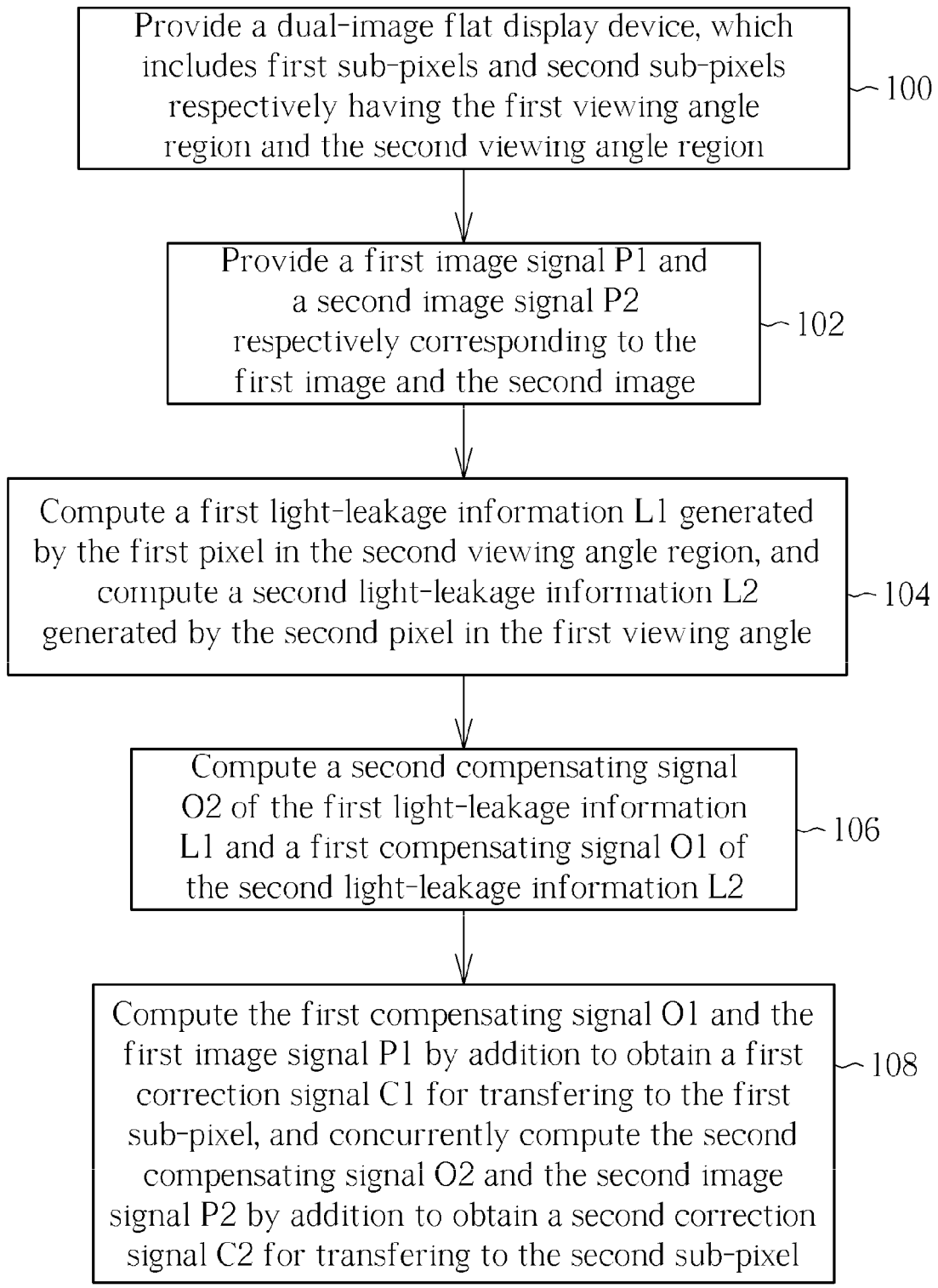
FIG. 20 is a schematic flowchart showing a functional block of a signal control method of a dual-image flat display device.

With reference to FIG. 19 and FIG. 20, FIG. 19 shows a functional block diagram of the signal control method of the dual-image flat display device 10 of the present invention, and FIG. 20 shows a schematic flowchart of the signal control method of the dual-image flat display device 10. Referring to FIG. 19 and FIG. 20 at the same time, the dual-image flat display device 10 includes a compensating operation unit 58, a first signal line driving circuit 60 and a second signal line driving circuit 62. At lest a first signal line 54 and at least a second signal line 56 are used for transferring control signals to the first sub-pixel 24 and the second sub-pixels 26 respectively from the first signal line driving circuit 60 and the second signal line driving circuit 62. The compensating operation unit 58 is used to compute the aforementioned complementary signals of the first and second light-leakage images 48', 50'. The signal control method of the dual-image flat display device 10 is described as follows.

Step 100: Provide the dual-image flat display device 10 of the present invention, which includes a plurality of first sub-pixels 24 and a plurality of second sub-pixels 26 respectively having the first viewing angle region 40 and the second viewing angle region 42.

Step 102: Provide a first image signal P1 and a second image signal P2 respectively corresponding to the first image 48 and the second image 50, and the first sub-pixels 24 and the second sub-pixels 26 are capable of concurrently displaying the first image 48 and the second image 50 respectively.

Step 104: Utilize the compensating operation unit 58 to compute a first light-leakage information L1, corresponding to the first image signal P1, generated by the first pixel 24 in the second viewing angle region 42, and to compute a second light-leakage information L2, corresponding to the second image signal P2, generated by the second pixel 26 in the first viewing angle 40.

Step 106: Utilize the compensating operation unit 58 to compute the second compensating signal O2 of the first light-leakage information L1 and the first compensating signal O1 of the second light-leakage information L2, wherein the second compensating signal O2 and the first compensating signal O1 are computed according to image-complementary principle. For instance, the second and first compensating signals O2, O1 are respectively obtained by providing all gray level signals firstly and respectively subtracting the first light-leakage information L1 and the second light-leakage information L2 from the all gray level signals.

Step 108: Compute the first compensating signal O1 and the first image signal P1 by addition to obtain a first correction signal C1 transferred to the first sub-pixels 24 to enable the first sub-pixels 24 to display a first correction image, and concurrently compute the second compensating signal O2 and the second image signal P2 by addition to obtain a second correction signal C2 transferred to the second sub-pixels 26 to enable the second sub-pixels 26 to display a second correction image.

Figure 21:
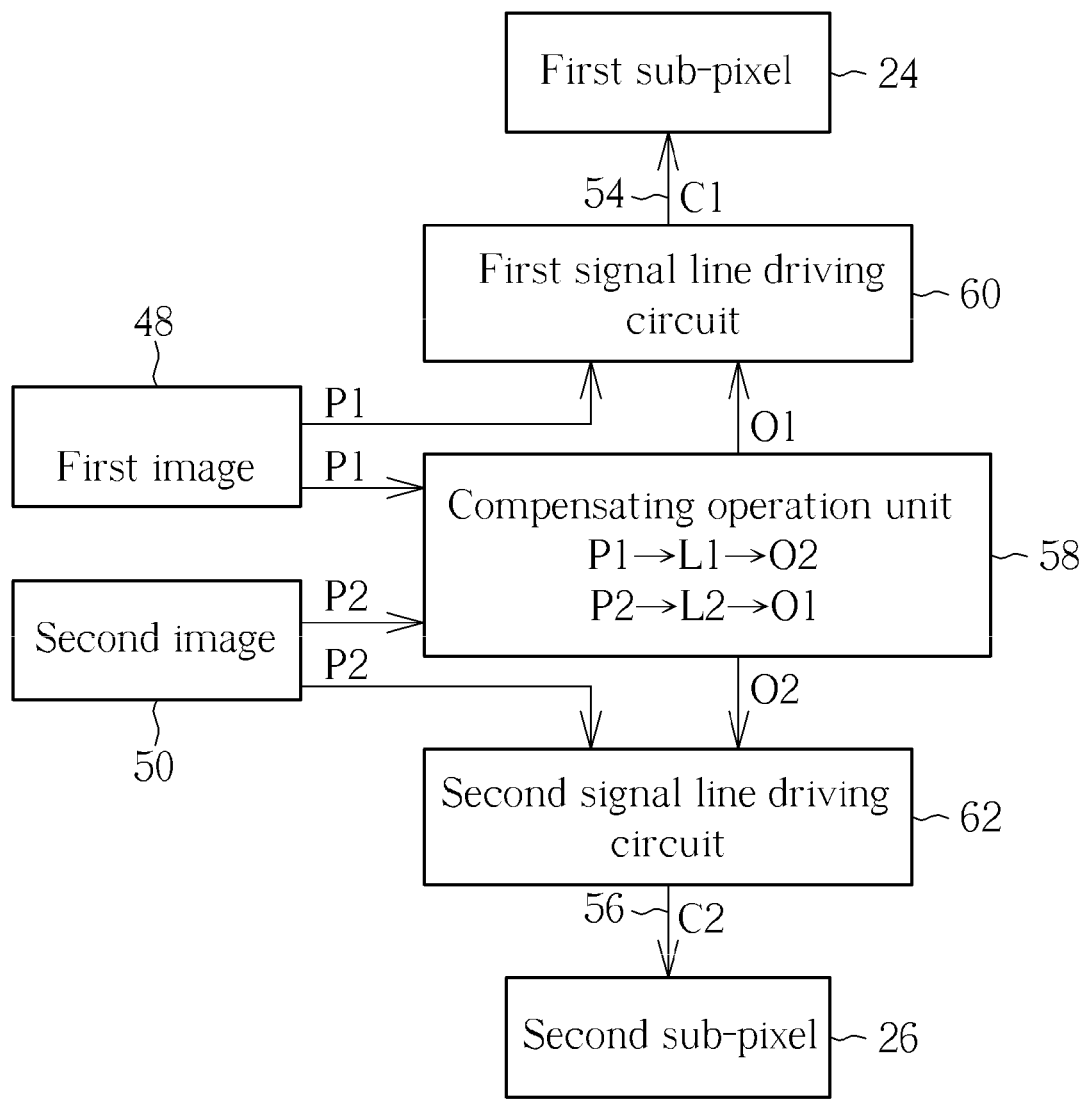
FIG. 21 is a functional block of another embodiment of a signal control method of a dual-image flat display device of the present invention.

Besides, in step 108, the first signal line driving circuit 60 and the second signal line driving circuit 62 can be utilized to respectively receive the first and second correction signals C1, C2 transferred from the compensating operation unit 58. Then, the first and second correction signals C1, C2 are respectively transferred to the first sub-pixels 24 and the second sub-pixels 26 through the first signal line 54 and the second signal line 56. However, in other embodiments, the first and second compensating signals O1, O2 may be transferred to the first and second signal line driving circuits 60, 62 through the compensating operation unit 58. Then, the first image signal P1, which is received by the first signal driving circuit 60, and the first compensating signal O1 are computed by addition to obtain the first correction signal C1. The first correction signal C1 is transferred to the first sub-pixels 24 through the first signal line 54 for displaying the image picture. Likewise, the second image signal P2 received by the second signal driving circuit 62 and the second compensating signal O2 are computed by addition to obtain the second correction signal C2 transferred to the second sub-pixels 26 through the second signal line 56 for displaying the image picture, as illustrated in FIG. 21.

Figure 22:
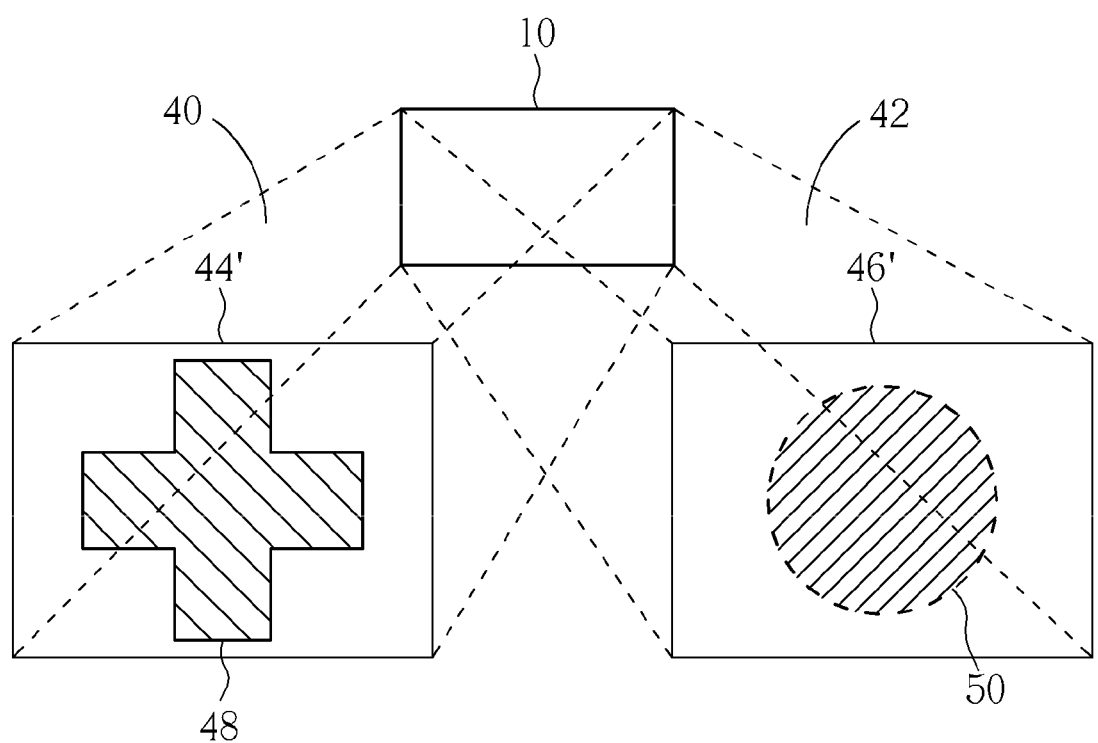
FIG. 22 is a schematic diagram of image pictures displayed by a dual-image flat display device of the present invention.

With reference to FIG. 22, FIG. 22 is a schematic diagram of the image picture displayed by the dual-image flat display device 10 of the present invention. The fore-mentioned signal control method of the present invention provides the corrected image signals to each of the sub-pixels and therefore the dual-image flat display device 10 consequently displays corrected image pictures 44', 46' respectively in the first and second viewing angle regions 40, 42. Herein, the corrected image picture 44' includes the first image 48 without having the second light-leakage image 50' illustrated in FIG. 17, and the corrected image picture 46' includes the first image 50 without having the first light-leakage image 48' illustrated in FIG. 17. Accordingly, users can see distinct and clear image pictures without interference of other image signals.

In brief, the dual-image flat display device of the present invention only has a single flat display panel including special-shaped pixel electrodes, and the liquid crystal molecules in different azimuthal angle domains of each of the pixels or sub-pixels of the flat display panel have included azimuthal angles with a particular range. Accordingly, the brightness or luminance produced by the two adjacent sub-pixels is infinitely different in different viewing angle regions such that independent and distinct image pictures are consequently generated in particular viewing angle regions by the two adjacent sub-pixels respectively. It should be noted that the achievement of disposing method of the liquid crystal molecules for enabling the included angle of azimuthal angles thereof in the first and second azimuthal angle domains less than 180° is not limited to the aforementioned theory embodiments through providing the pixel electrode with special shapes or patterns, and the objective thereof can be achieved by utilizing photo alignment or alignment films to enable the liquid crystal molecules to have particular pre-tilt angles. Since other methods of disposing liquid crystal molecules are not key points of the present invention, no more detailed description is provided herein. Moreover, in comparison with the conventional technique, the present invention further provides a signal control method of a dual-image flat display device such that the complementary image of the light-leakage images can be calculated by light-leakage information and all gray level picture to improve the condition that image pictures interfere with each other and enable users to see independent, distinct, and entire image pictures in each viewing angle region. It should be noted that the signal control method of the dual-image flat display device of the present invention is not limited to the dual-image flat display device with the structure design or pixel structures mentioned in the above embodiments of the present invention. The spirit of the signal control method of the present invention can be applied to a variety of displays including single display panel that displays a plurality of image pictures at the same time.

Those skilled in the art will readily observe that numerous modifications and alterations of the device and method may be made while retaining the teachings of the invention.

What is claimed is:

1. A dual-image flat display device comprising:
   a first substrate;
   a second substrate disposed parallel and opposite to the first substrate;
   a liquid crystal layer comprising a plurality of liquid crystal molecules and disposed between the first substrate and the second substrate; and
   at least a pixel disposed on the second substrate, the pixel comprising a plurality of sub-pixels arranged side by side along a first direction, each of the sub-pixels comprising a first azimuthal angle domain and a second azimuthal angle domain, the first azimuthal angle domain and the second azimuthal angle domain being arranged side by side along a second direction in the sub-pixel, azimuthal angles of the liquid crystal molecules of the first and second azimuthal angle domains having an included angle less than 180°, and the first direction being nonparallel to the second direction, wherein at least one of the sub-pixels comprises a first pixel electrode, the first pixel electrode comprises a plurality of first pixel electrode branches parallel with each other, each of the first pixel electrode branches is straight and stretches along a stretching direction, and a long axis of the liquid crystal molecules disposed between the first pixel electrode branches is respectively parallel to the stretching direction of the first pixel electrode branches, wherein at least some of the liquid crystal molecules are disposed between two adjacent first pixel electrode branches.

2. The dual-image flat display device of claim 1, wherein the azimuthal angle of the liquid crystal molecules of each of the first azimuthal angle domains is in the range from about 40° to 50°.

3. The dual-image flat display device of claim 1, wherein the azimuthal angle of the liquid crystal molecules of each of the second azimuthal angle domains is in the range from about −40° to −50°.

4. The dual-image flat display device of claim 1, wherein the liquid crystal molecules in the first azimuthal angle domain and in the second azimuthal angle domain are arranged with mirror symmetry in the pixel.

5. The dual-image flat display device of claim 1, wherein the liquid crystal molecules in the first and second azimuthal angle domains have an included angle of about 80° or 100° in each of the sub-pixels while an electric voltage is applied on the sub-pixels.

6. The dual-image flat display device of claim 1, wherein the sub-pixels in the pixel are respectively defined as a first sub-pixel and a second sub-pixel arranged side by side along the first direction.

7. The dual-image flat display device of claim 6, wherein the first sub-pixel and the second sub-pixel respectively comprise the first pixel electrode and a second pixel electrode.

8. The dual-image flat display device of claim 7, wherein the first pixel electrode has a shape with mirror symmetry symmetrical to a symmetry line, and the second pixel electrode has a shape with mirror symmetry symmetrical to the symmetry line.

9. The dual-image flat display device of claim 8, wherein the symmetry line is parallel to the first direction.

10. The dual-image flat display device of claim 8, wherein the first pixel electrode comprises a plurality of second pixel electrode branches parallel with each others, and the first pixel electrode branches and the second pixel electrode branches are mutually symmetrical along the symmetry line.

11. The dual-image flat display device of claim 10, wherein the first pixel electrode branches and the second pixel electrode branches have an included angle in the range from about 80° to 100°.

12. The dual-image flat display device of claim 11, wherein the second pixel electrode comprises a plurality of third pixel electrode branches parallel with each other and a plurality of mutually parallel fourth pixel electrode branches parallel with each other, the third pixel electrode branches and the fourth pixel electrode branches are mutually symmetrical along the symmetry line, and the adjacent first pixel electrode branches and the third pixel electrode branches have an included angle in the range from about 100° to 80°.

13. The dual-image flat display device of claim 12, wherein the first pixel electrode and the second pixel electrode respectively comprise a first pixel electrode trunk and a second pixel electrode trunk at least arranged along the second direction, the first pixel electrode branches and the second pixel electrode branches are connected to the first pixel electrode trunk, and the third pixel electrode branches and the fourth pixel electrode branches are connected to the second pixel electrode trunk.

14. The dual-image flat display device of claim 13, wherein the first pixel electrode trunk and the second pixel electrode trunk are arranged side by side and mutually parallel.

15. The dual-image flat display device of claim 13, wherein the first pixel electrode branches and the second pixel electrode branches are disposed between the first pixel electrode trunk and the second pixel electrode trunk.

16. The dual-image flat display device of claim 13, wherein the first pixel electrode trunk and the second pixel electrode trunk are disposed between the first pixel electrode branches and the third pixel electrode branches.

17. The dual-image flat display device of claim 7, wherein the first pixel electrode and the second pixel electrode are mutually asymmetrical with each other.

18. The dual-image flat display device of claim 7, wherein the first pixel electrode and the second pixel electrode are arranged with mirror symmetry with each other.

19. The dual-image flat display device of claim 6, wherein the first sub-pixel and the second sub-pixel are used to respectively display a first image and a second image concurrently and enable a user to see the first image in a first viewing angle region or the second image in a second viewing angle region.

20. The dual-image flat display device of claim 19, further comprising a compensating operation unit, the compensating operation unit carrying on an operation according to a light-leakage information of the second image in the first viewing angle region so as to provide a compensating signal of the light-leakage information to the first sub-pixel.

21. The dual-image flat display device of claim 1, wherein the pixel comprises a first sub-pixel, a second sub-pixel and a third sub-pixel, which are alternately arranged along the first direction.

22. The dual-image flat display device of claim 21, wherein the first sub-pixel, the second sub-pixel and the third sub-pixel respectively have the first pixel electrode or a second pixel electrode.

23. The dual-image flat display device of claim 22, wherein the first pixel electrode and the second pixel electrode are arranged side by side along the first direction and alternately disposed in the first sub-pixel, the second sub-pixel and the third sub-pixel.

24. The dual-image flat display device of claim 22, wherein the pixel further comprises a fourth sub-pixel, and the first pixel electrode and the second pixel electrode are arranged along the first direction and are alternately disposed in the first sub-pixel, the second sub-pixel, the third sub-pixel and the fourth sub-pixel.

25. The dual-image flat display device of claim 1, wherein the pixel comprises a first sub-pixel, a second sub-pixel and a third sub-pixel, which are alternately arranged along the second direction.

26. The dual-image flat display device of claim 25, wherein the first sub-pixel, the second sub-pixel and the third sub-pixel respectively have the first pixel electrode or a second pixel electrode, and the first pixel electrode and the second pixel electrode are arranged side by side along the second direction and are alternately disposed in the first sub-pixel, the second sub-pixel and the third sub-pixel.

27. The dual-image flat display device of claim 25, further comprising a plurality of the first pixel electrodes and a plurality of second pixel electrodes individually disposed in the first sub-pixel, the second sub-pixel, or the third sub-pixel, wherein each of the first pixel electrodes is disposed adjacent to four second pixel electrodes.

28. The dual-image flat display device of claim 1, wherein the first direction is perpendicular to the second direction.

29. A signal control method of a dual-image flat display device, wherein the dual-image flat display device comprises a single flat display panel, the single flat display panel comprising:
   a plurality of first sub-pixels having a first viewing angle region;
   a plurality of second sub-pixels having a second viewing angle region;
wherein the first sub-pixels and the second sub-pixels are used for concurrently displaying a first image and a second image respectively and enabling a user to see the first image in a first viewing angle region or the second image in a second viewing angle region, wherein the first image is different from the second image, and the first image and the second image are respectively corresponding to a first image signal and a second image signal;
   a first substrate;
   a second substrate disposed parallel and opposite to the first substrate;
   a liquid crystal layer comprising a plurality of liquid crystal molecules disposed between the first substrate and the second substrate; and
   at least a pixel disposed on the second substrate and comprising at least one of the first sub-pixels and at least one of the second sub-pixels arranged side by side along a first direction, each of the first and second sub-pixels comprising a first azimuthal angle domain and a second azimuthal angle domain arranged side by side along a second direction in the first or second sub-pixels, azimuthal angles of the liquid crystal molecules in the first and second azimuthal angle domains having an included angle less than about 180°, and the first direction being nonparallel to the second direction, wherein the first sub-pixel comprises a first pixel electrode, the first pixel electrode comprises a plurality of first pixel electrode branches parallel with each other, each of the first pixel electrode branches is straight and stretches along a stretching direction, and a long axis of the liquid crystal molecules disposed between the first pixel electrode branches is respectively parallel to the stretching direction of the first pixel electrode branches, wherein at least some of the liquid crystal molecules are disposed between two adjacent first pixel electrode branches;
the signal control method comprising:
(a) computing a first light-leakage information of the first image signal generated by the first sub-pixel in the second viewing angle region;
(b) computing a second compensating signal of the first light-leakage information; and
(c) computing the second compensating signal and the second image signal by addition to obtain a second correction signal transferred to the second sub-pixel and to enable the second sub-pixel to display a second correction image so as to keep the first image from being seen by a viewer in the second viewing angle region.

30. The signal control method of claim 29, further comprising:
   in the step (a), concurrently computing a second light-leakage information of the second image signal generated by the second sub-pixel in the first viewing angle region;
   in the step (b), concurrently computing a first compensating signal of the second light-leakage information; and
   in the step (c), concurrently computing the first compensating signal and the first image signal by addition to obtain a first correction signal transferred to the first sub-pixel to enable the first sub-pixel to display a first correction image.

31. The signal control method of claim 29, wherein the step (b) is to utilize a method of image-complementary computation to obtain the second compensating signal of the first light-leakage information.

32. The signal control method of claim 31, wherein the step (b) comprises:
providing an all gray-scale signal; and
obtaining the second compensating signal by subtracting the first light-leakage information from the all gray-scale signal.

33. The signal control method of claim 29, further comprising providing a compensating operation unit to perform the computations in the step (b) and step (c).

34. The signal control method of claim 29, wherein the azimuthal angle of each of the first azimuthal angle domains is in the range from about 40° to 50°, and the azimuthal angle of each of the second azimuthal angle domains is in the range from about −40° to −50°.

35. The signal control method of claim 29, wherein the liquid crystal molecules in the first and second azimuthal angle domains are arranged with mirror symmetry in the pixel.

36. The signal control method of claim 29, wherein the liquid crystal molecules in the first and second azimuthal angle domains have an included angle about 80° or 100° in each of the first and second sub-pixels while an electric voltage is applied on each sub-pixel.

37. The signal control method of claim 29, wherein the second sub-pixel comprises a second pixel electrode, the first pixel electrode has a shape with mirror symmetry symmetrical to a symmetry line, and the second pixel electrode has a shape with mirror symmetry symmetrical to the symmetry line.

38. The signal control method of claim 37, wherein the symmetry line is parallel to the first direction.

39. The signal control method of claim 37, wherein the first pixel electrode comprises a plurality of second pixel electrode branches parallel with each other, and the first pixel electrode branches and the second pixel electrode branches are mutually symmetrical along the symmetry line.

40. The signal control method of claim 39, wherein the first pixel electrode branches and the second pixel electrode branches have an included angle in the range from about 80° to 100°.

41. The signal control method of claim 39, wherein the first pixel electrode comprises a first pixel electrode trunk at least arranged along the second direction, and the first pixel electrode branches and the second pixel electrode branches are connected to the first pixel electrode trunk.

42. The signal control method of claim 37, wherein the first pixel electrode and the second pixel electrode are mutually asymmetrical.

43. The signal control method of claim 37, wherein the first pixel electrode and the second pixel electrode in the pixel have mirror symmetry.

44. The signal control method of claim 33, wherein the first direction is perpendicular to the second direction.

\* \* \* \* \*